US011985492B2

(12) United States Patent
Shinmen et al.

(10) Patent No.: US 11,985,492 B2
(45) Date of Patent: May 14, 2024

(54) SPEAKER AND METHOD OF MANUFACTURING A SPEAKER

(71) Applicant: Sony Group Corporation, Tokyo (JP)

(72) Inventors: Naoki Shinmen, Tokyo (JP); Koya Nomoto, Aichi (JP); Go Igarashi, Tokyo (JP); Takanari Okita, Aichi (JP)

(73) Assignee: Sony Group Corporation, Tokyo (JP)

( * ) Notice: Subject to any disclaimer, the term of this patent is extended or adjusted under 35 U.S.C. 154(b) by 169 days.

(21) Appl. No.: 17/440,697

(22) PCT Filed: Mar. 11, 2020

(86) PCT No.: PCT/JP2020/010551
§ 371 (c)(1),
(2) Date: Sep. 17, 2021

(87) PCT Pub. No.: WO2020/195837
PCT Pub. Date: Oct. 1, 2020

(65) Prior Publication Data

US 2022/0167090 A1 May 26, 2022

(30) Foreign Application Priority Data

Mar. 25, 2019 (JP) ................................ 2019-056894

(51) Int. Cl.
*H04R 9/02* (2006.01)
*H04R 31/00* (2006.01)

(52) U.S. Cl.
CPC ............. *H04R 9/025* (2013.01); *H04R 31/00* (2013.01)

(58) Field of Classification Search
CPC .......... H04R 9/025; H04R 31/00; H04R 7/18; H04R 31/006; H04R 2209/024; H04R 2400/11; H04R 9/06; H04R 9/02
See application file for complete search history.

(56) References Cited

U.S. PATENT DOCUMENTS 8,345,915 B2 * 1/2013 Shin ........................ H04M 1/03 381/396
8,855,356 B1 * 10/2014 Price ........................ H04R 9/02 381/420

(Continued)

FOREIGN PATENT DOCUMENTS

GB 2311438 A 9/1997
JP H07-284196 A 10/1995

(Continued)

OTHER PUBLICATIONS

International Search Report and English translation thereof dated Apr. 7, 2020 in connection with International Application No. PCT/JP2020/010551.

(Continued)

*Primary Examiner* — Angelica M McKinney
(74) *Attorney, Agent, or Firm* — Wolf, Greenfield & Sacks, P.C.

(57) ABSTRACT

It is an object to provide a speaker including a strong magnetic circuit and a method of manufacturing a speaker. To achieve the object, a speaker according to the present technology includes an outer magnet and an inner magnet. The outer magnet has a ring shape and is magnetized along an axial direction of the ring shape. The inner magnet has a circular outer shape when viewed from the axial direction of the outer magnet, is magnetized in a direction opposite to a direction of the outer magnet along the axial direction, and is disposed inside the outer magnet through a gap.

15 Claims, 13 Drawing Sheets

(56) References Cited

U.S. PATENT DOCUMENTS

| | | | | |
|---|---|---|---|---|
| 10,869,131 | B2 * | 12/2020 | Weber | H04R 7/02 |
| 2002/0090106 | A1 * | 7/2002 | Guenther | H04R 9/02<br>381/412 |
| 2002/0131612 | A1 * | 9/2002 | Son | B06B 1/045<br>381/412 |
| 2007/0009133 | A1 * | 1/2007 | Gerkinsmeyer | H04R 7/127<br>381/424 |
| 2008/0181446 | A1 | 7/2008 | Hsu | |
| 2011/0123061 | A1 | 5/2011 | Kamimura | |
| 2018/0027332 | A1 | 1/2018 | Mao | |

FOREIGN PATENT DOCUMENTS

| | | | |
|---|---|---|---|
| JP | 2005-311449 | A | 11/2005 |
| JP | 2008-187456 | A | 8/2008 |
| KR | 2002-0073876 | A | 9/2002 |
| KR | 20040110467 | A | 12/2004 |
| KR | 100503006 | B1 * | 7/2005 |

OTHER PUBLICATIONS

Written Opinion and English translation thereof dated Apr. 7, 2020 in connection with International Application No. PCT/JP2020/010551.

International Preliminary Report on Patentability and English translation thereof dated Oct. 7, 2021 in connection with International Application No. PCT/JP2020/010551.

Extended European Search Report dated Apr. 29, 2022 in connection with European Application No. 20776308.7.

* cited by examiner

A

B

C

A

B

A

B

SPEAKER AND METHOD OF MANUFACTURING A SPEAKER

CROSS-REFERENCE TO RELATED APPLICATIONS

This application claims the benefit under 35 U.S.C. § 371 as a U.S. National Stage Entry of International Application No. PCT/JP2020/010551, filed in the Japanese Patent Office as a Receiving Office on Mar. 11, 2020, which claims priority to Japanese Patent Application Number JP2019-056894, filed in the Japanese Patent Office on Mar. 25, 2019, each of which is hereby incorporated by reference in its entirety.

TECHNICAL FIELD

The present technology relates to a speaker and a method of manufacturing a speaker.

BACKGROUND ART

Conventionally, inner magnetic type speakers and outer magnetic type speakers have been known as small speakers used in headphones or the like. For example, FIGS. 1, 5, and 6 of Patent Literature 1 show an inner magnetic type speaker. FIGS. 4 and 7 of Patent Literature 1 show an outer magnetic type speaker. Of those, in the inner magnetic type speaker shown in FIGS. 1 and 5 and the outer magnetic type speaker shown in FIG. 4, a permanent magnet is divided into a plurality of magnets, and the plurality of magnets is formed by a transverse magnetic field press method. This improves the magnetic characteristics of the permanent magnet and achieves a strong and efficient magnetic circuit (e.g., paragraphs [0022], [0034], and the like of the specification of Patent Literature 1).

Further, FIGS. 4, 5, and 7 to 10 of Patent Literature 2 show an outer magnetic type speaker. In this outer magnetic type speaker, a conductor portion that is a structure having a smaller electric resistance ratio than that of a magnetic body material constituting a magnetic circuit is disposed near the voice coil of a driver unit. Electromagnetic induction coupling is then generated between the voice coil and the conductor portion, to reduce the inductance of the voice coil. This achieves good noise cancellation effects (e.g., paragraphs [0040] to [0047] and the like of the specification of Patent Literature 2).

CITATION LIST

Patent Literature

Patent Literature 1: Japanese Patent Application Laid-open No. 2005-311449

Patent Literature 2: Japanese Patent Application Laid-open No. 2008-187456

DISCLOSURE OF INVENTION

Technical Problem

The technologies for improving the performance of speakers have been developed as described above, and new technologies capable of achieving powerful magnetic circuits are expected.

In view of the above circumstances, it is an object of the present technology to provide a speaker including a strong magnetic circuit and a method of manufacturing a speaker.

Solution to Problem

In order to achieve the above object, a speaker according to an embodiment of the present technology includes an outer magnet and an inner magnet.

The outer magnet has a ring shape and is magnetized along an axial direction of the ring shape.

The inner magnet has a circular outer shape when viewed from the axial direction of the outer magnet, is magnetized in a direction opposite to a direction of the outer magnet along the axial direction, and is disposed inside the outer magnet through a gap.

In this speaker, the inner magnet magnetized in the direction opposite to the direction of the outer magnet is disposed inside the outer magnet of the ring shape through a gap. This makes it possible to provide a speaker having a strong magnetic circuit.

The inner magnet may have a ring shape having an axial direction equal to the axial direction of the outer magnet.

The speaker further includes an outer component portion, an inner component portion, and a vibrating plate component portion.

The outer component portion includes the outer magnet.

The inner component portion includes the inner magnet and forms a magnetic gap with the outer component portion.

The vibrating plate component portion includes a coil disposed in the magnetic gap and a vibrating plate.

The outer component portion may have an opening that is opened perpendicularly to the axial direction and has a diameter larger than an outer diameter of the inner magnet. In this case, the inner magnet may be inserted into the opening and fixed.

When a side on which the vibrating plate component portion is connected to the outer component portion in the axial direction is a first side, and a side opposite to the first side is a second side, the opening may be formed on the second side of the outer component portion.

A lead wire of the coil may be extracted to an outside through the opening.

A position of a central axis of the outer magnet, a position of a central axis of the inner magnet, and a position of a central axis of the coil may be configured to be equal to each other. In this case, the inner component portion may include a through-hole extending along the axial direction at the position of the central axis of the inner magnet.

When a side on which the vibrating plate component portion is connected to the outer component portion in the axial direction is a first side, and a side opposite to the first side is a second side, the inner component portion may include an inner yoke magnetically connected to the second side of the inner magnet.

The inner yoke may include a first portion corresponding to the coil and a second portion corresponding to the inner magnet when viewed from the axial direction. In this case, a thickness of the first portion may be smaller than a thickness of the second portion.

The outer component portion may include an outer yoke magnetically connected to the second side of the outer magnet.

The inner yoke and the outer yoke may be connected to each other by welding.

The vibrating plate component portion may include a support magnet that supports the vibrating plate and is magnetized in a direction opposite to the direction of the outer magnet along the axial direction.

A method of manufacturing a speaker according to an embodiment of the present technology includes: forming an outer component portion including an outer magnet that has a ring shape and is magnetized along an axial direction of the ring shape; forming an inner component portion including an inner magnet that has a circular outer shape with a diameter smaller than an inner diameter of the outer magnet and is magnetized along an axial direction of the circular shape; and assembling the outer component portion and the inner component portion such that the inner magnet is disposed inside the outer magnet through a gap and such that a magnetizing direction of the outer magnet and a magnetizing direction of the inner magnet are opposite to each other.

The inner magnet may have a ring shape with the diameter smaller than a diameter of the outer magnet. In this case, the forming the inner component portion may include forming a through-hole extending along an axial direction at a position of a central axis of the inner magnet.

The assembling the outer component portion and the inner component portion may include inserting the inner magnet into an opening formed on a side opposite to a side of the outer component portion to which a vibrating plate component portion including a coil and a vibrating plate is connected.

The assembling the outer component portion and the inner component portion may include supporting at least one of the outer component portion or the inner component portion by a jig for equalizing the axial direction of the outer magnet and the axial direction of the inner magnet.

The method of manufacturing a speaker may further include: forming a vibrating plate component portion including a coil and a vibrating plate; and assembling the outer component portion, the inner component portion, and the vibrating plate component portion such that the coil is disposed in a magnetic gap between the outer component portion and the inner component portion.

The method of manufacturing a speaker may further include forming a vibrating plate component portion including a coil and a vibrating plate. In this case, the forming the outer component portion may include assembling the unmagnetized outer component portion and the vibrating plate component portion, and magnetizing the unmagnetized outer magnet after the assembling the unmagnetized outer component portion and the vibrating plate component portion. Further, the assembling the outer component portion and the inner component portion may include assembling the inner component portion to the outer component portion in which the vibrating plate component portion is assembled, such that the coil is disposed in a magnetic gap between the outer component portion and the inner component portion.

The forming the outer component portion may include fixing a lead wire of the coil of the vibrating plate component portion by soldering between the assembling the unmagnetized outer component portion and the vibrating plate component portion and the magnetizing the unmagnetized outer magnet.

When a side on which the vibrating plate component portion is connected to the outer component portion is a first side, and a side opposite to the first side is a second side, the forming the outer component portion may include arranging an outer yoke on the second side of the outer magnet. In this case, the forming the inner component portion may include arranging an inner yoke on the second side of the inner magnet. Further, the assembling the outer component portion and the inner component portion may include connecting the outer yoke and the inner yoke to each other by welding.

MODE(S) FOR CARRYING OUT THE INVENTION

Embodiments according to the present technology will now be described below with reference to the drawings.

First Embodiment

[Configuration of Speaker]

Figure 1:
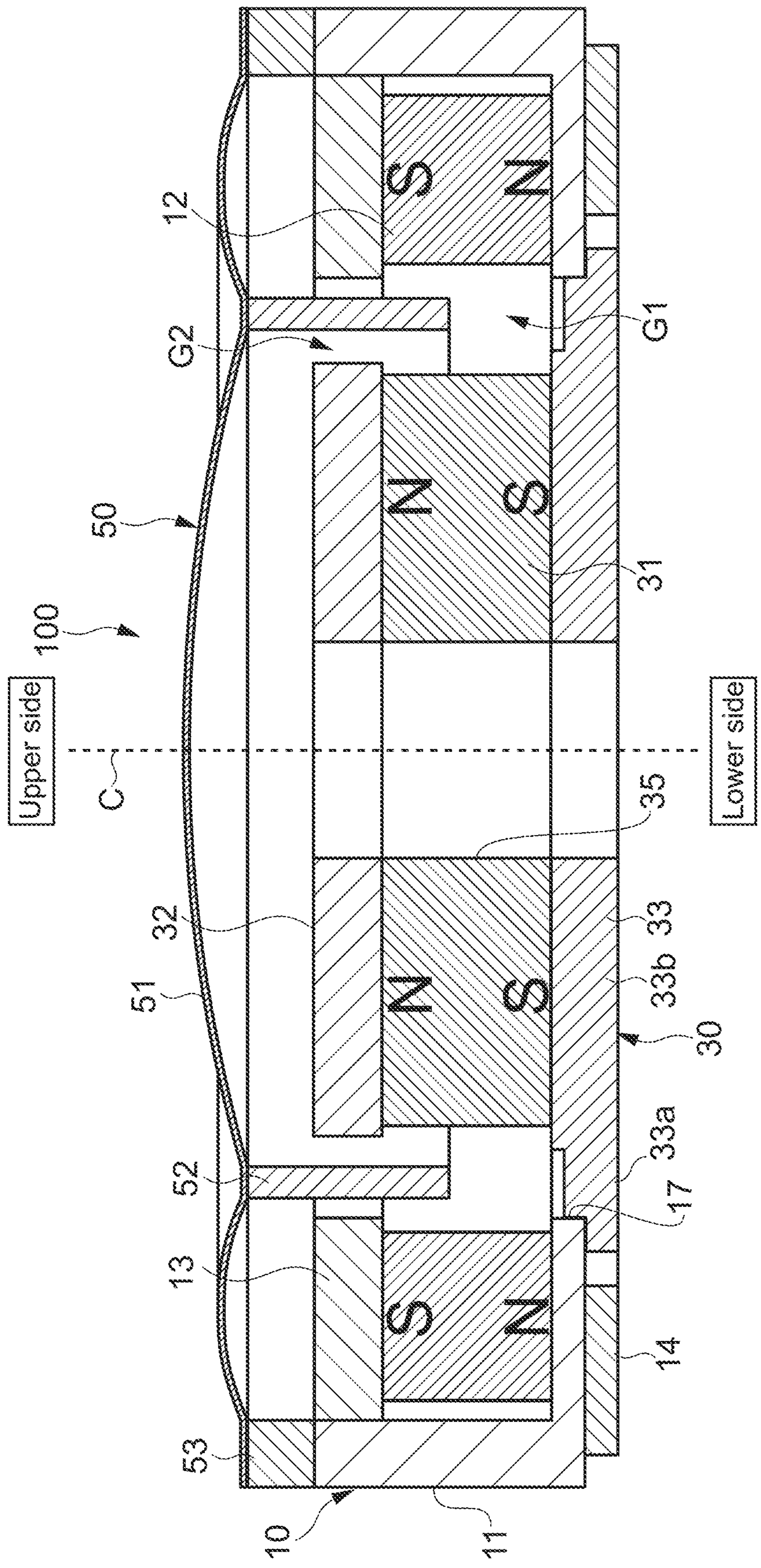
FIG. 1 is a schematic cross-sectional view showing a configuration example of a speaker according to a first embodiment.

FIG. 1 is a schematic cross-sectional view showing a configuration example of a speaker according to a first embodiment of the present technology. The speaker is a device that outputs sound so as to emit the sound into space by being driven by the amplified output of sound signals. The speaker can also be referred to as a driver.

A speaker 100 according to this embodiment has a columnar shape as an overall general shape. The cross-sectional view shown in FIG. 1 is a cross-sectional view taken along the axial direction of the central axis of the columnar shape on the diameter of the speaker 100. Hereinafter, the central axis of the speaker 100 will be referred to as a reference axis C.

Figure 2:
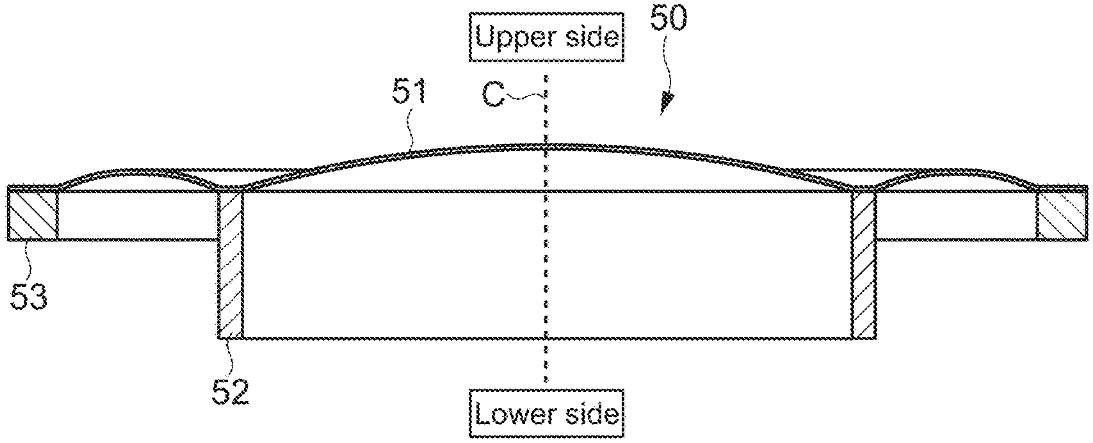
FIG. 2 is a schematic cross-sectional view individually showing an outer assembly, an inner assembly, and a vibrating plate assembly included in the speaker.
Figure 2:
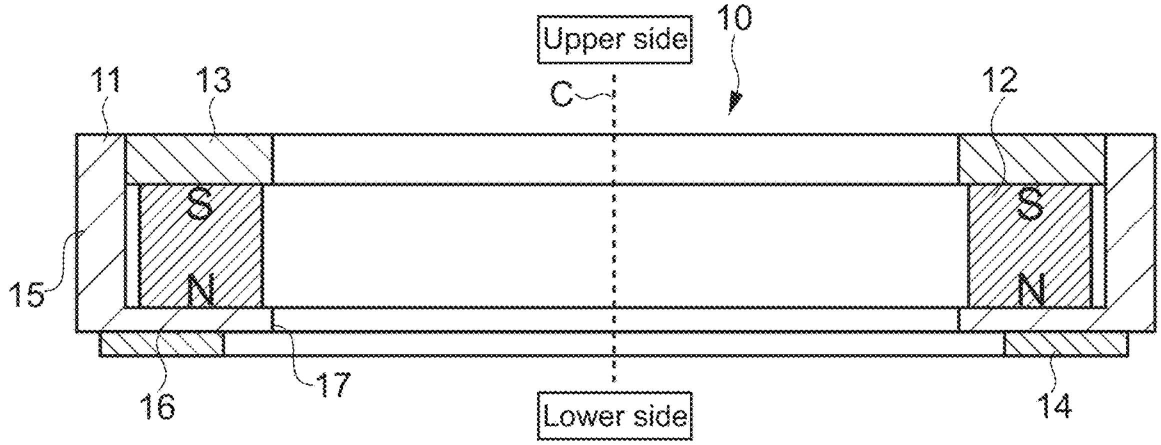
Figure 2:
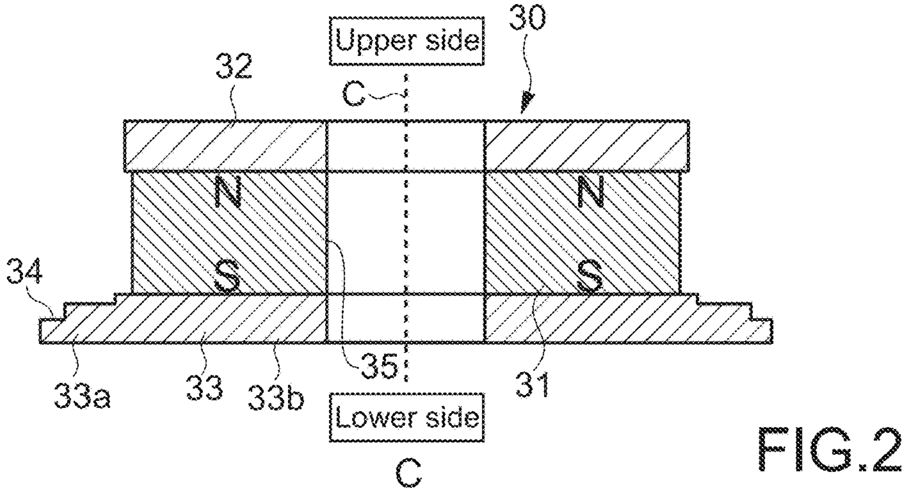
Figure 3:
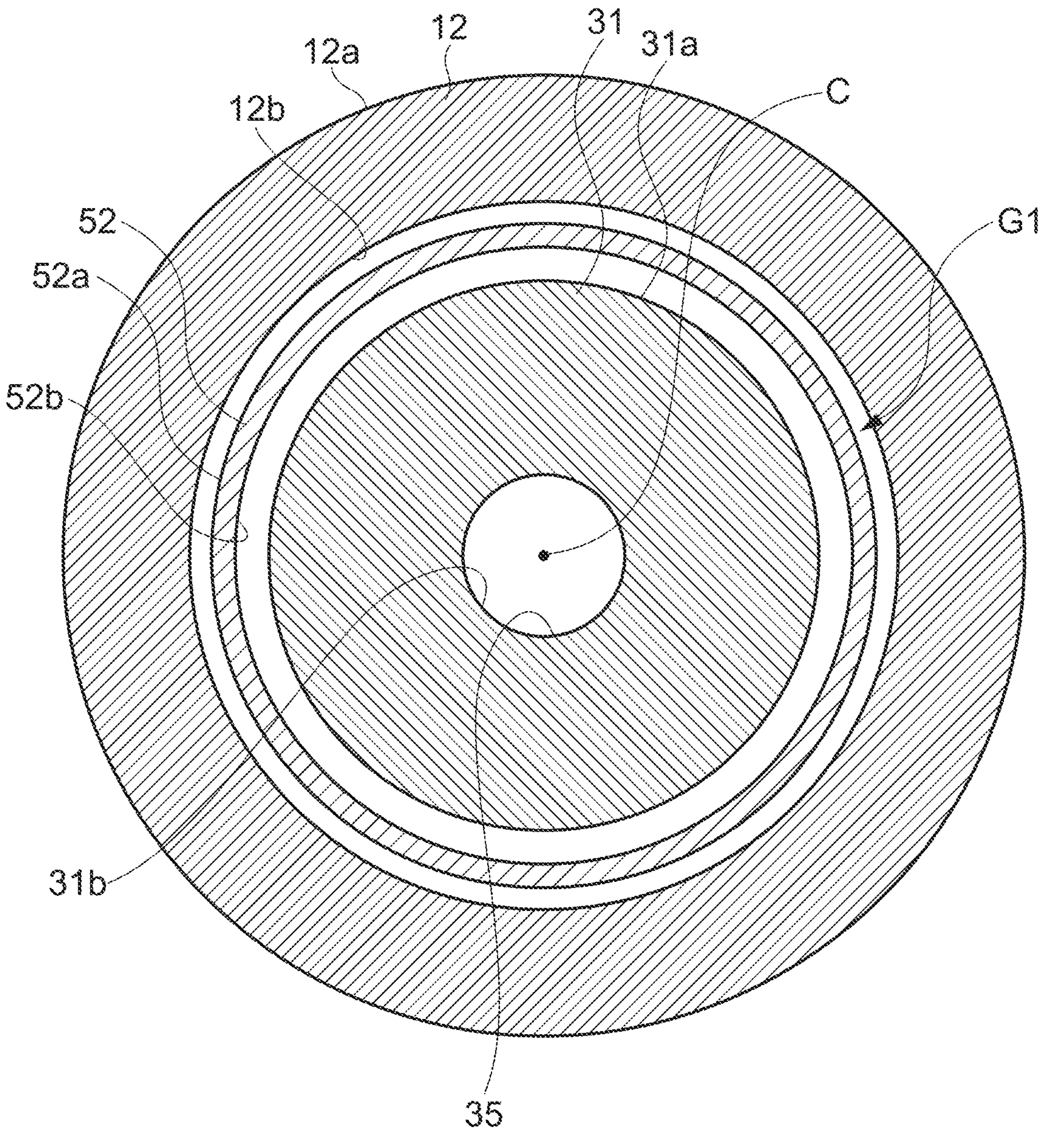
FIG. 3 is a schematic view showing a positional relationship between an outer magnet, an inner magnet, and a voice coil included in the speaker when viewed from the axial direction of a reference axis.

FIG. 2 is a schematic cross-sectional view individually showing an outer assembly 10, an inner assembly 30, and a vibrating plate assembly 50 included in the speaker 100. FIG. 3 is a schematic view showing a positional relationship between an outer magnet 12, an inner magnet 31, and a voice coil 52 included in the speaker 100 when viewed from the axial direction of the reference axis C.

Hereinafter, the configuration example of the speaker 100 according to this embodiment will be described with reference to FIGS. 1 to 3.

Note that the axial direction of the reference axis C shown in FIG. 1 will be described as a vertical direction for convenience in the following description. Expressions such as the upper side of a member and the lower side of a member will be used for each member. Of course the direction or the like in which the speaker 100 is used is not limited, and the axial direction of the reference axis C can be set to any direction.

As shown in FIGS. 1 and 2, the speaker 100 includes the outer assembly 10, the inner assembly 30, and the vibrating plate assembly 50. In this embodiment, each assembly is configured with the reference C as a reference.

Outer Assembly

The outer assembly 10 includes a housing 11, the outer magnet 12, an outer plate 13, and a terminal plate 14.

The housing 11 has a cylindrical shape in which the upper side is open, and is formed such that the reference axis C is the central axis. The housing 11 includes a side portion 15 and a bottom portion 16. The side portion 15 is formed so as to surround the reference axis C and extends along the axial direction of the reference axis C.

The bottom portion 16 is coupled to the lower side of the side portion 15 and is formed along a direction perpendicular to the axial direction of the reference axis C. Further, a circular opening 17 is formed at the central portion of the bottom portion 16 with the position of the reference axis C as the center. The opening 17 is opened perpendicularly to the axial direction of the reference axis C.

The housing 11 is a nonmagnetic body and is formed of any nonmagnetic material such as plastic, for example.

As shown in FIG. 3, the outer magnet 12 has a ring shape (annular shape) and is formed such that the reference axis C is the central axis. Thus, the axial direction of the ring shape of the outer magnet 12 is equal to the axial direction of the reference axis C.

As shown in FIGS. 1 and 2, the outer magnet 12 is disposed inside the side portion 15 of the housing 11 and on the upper side of the bottom portion 16. Thus, the outer magnet 12 is supported by the housing 11 such that the outer peripheral side thereof is surrounded by the housing 11.

The inner diameter of the outer magnet 12 is larger than the diameter of the opening 17 formed in the bottom portion 16. The outer diameter of the outer magnet 12 is smaller than the outer diameter of the bottom portion 16. Thus, the outer magnet 12 is disposed to fit within the bottom portion 16 of the housing 11 when viewed in the axial direction of the reference axis C.

Further, as shown in FIGS. 1 and 2, the outer magnet 12 is magnetized along the axial direction of the ring shape, i.e., the axial direction of the reference axis C. In this embodiment, the outer magnet 12 is magnetized such that the upper side is the S pole and the lower side is the N pole.

Examples of the outer magnet 12 to be used include a permanent magnet formed of any magnetic material, such as a ferrite magnet, an alnico magnet, or a neodymium magnet.

The outer plate 13 has a ring shape and is formed such that the reference axis C is the central axis. The outer plate 13 is disposed on the upper side of the outer magnet 12. The inner diameter of the outer plate 13 is smaller than the inner diameter of the outer magnet 12, and the outer diameter of the outer plate 13 is larger than the outer diameter of the outer magnet 12. Thus, the outer plate 13 is disposed so as to cover the entire surface of the upper side of the outer magnet 12 when viewed from the axial direction of the reference axis C.

The outer plate 13 is a soft magnetic body and is formed of any soft magnetic material such as iron. Thus, the outer plate 13 is magnetically connected to the outer magnet 12. The outer plate 13 is disposed for magnetic induction and functions as a component constituting a magnetic circuit. That is, the outer plate 13 functions as a yoke.

The terminal plate 14 has a ring shape and is formed such that the reference axis C is the central axis. The terminal plate 14 is connected to the lower side of the bottom portion 16 of the housing 11. The inner diameter of the terminal plate 14 is larger than the diameter of the opening 17 formed in the bottom portion 16. Thus, the terminal plate 14 does not close the opening 17.

The terminal plate 14 has a function of fastening a lead wire when the lead wire of the voice coil 52 of the vibrating plate assembly 50 is extracted to the outside. Note that the illustration of the lead wire of the voice coil 52 is omitted in FIGS. 1 and 2. The lead wire of the voice coil 52 will be described later.

The inner assembly 30 includes the inner magnet 31, a pole piece 32, and an inner yoke 33.

As shown in FIG. 3, the inner magnet 31 has a ring shape and is formed such that the reference axis C is the central axis. Thus, the axial direction of the ring shape of the inner magnet 31 is equal to the axial direction of the reference axis C. Thus, the axial direction of the outer magnet 12 and the axial direction of the inner magnet 31 are equal to each other.

When viewed from the axial direction of the reference axis C, the outer shape of the inner magnet 31 (the shape of the outer peripheral surface 31*a*) is a circular shape. The outer diameter of the inner magnet 31 is smaller than the diameter of the opening 17 formed in the bottom portion 16 of the outer assembly 10. Thus, the outer diameter of the inner magnet 31 is smaller than the inner diameter of the outer magnet 12 of the outer assembly 10. As shown in FIGS. 1 and 3, the inner magnet 31 is disposed inside the outer magnet 12 through a gap G1. The width of the gap G1 is designed to be uniform over the entire circumference of the reference axis C.

Further, in this embodiment, the thickness of the outer magnet 12 and the thickness of the inner magnet 31 are designed to be equal to each other in the vertical direction. Further, the position of the outer magnet 12 and the position of the inner magnet 31 are designed to be equal to each other in the vertical direction.

That is, in the vertical direction, the upper surface of the outer magnet 12 and the upper surface of the inner magnet 31 are at positions equal to each other. Further, in the vertical direction, the lower surface of the outer magnet 12 and the lower surface of the inner magnet 31 are at positions equal to each other. It goes without saying that the present technology is not limited to such a configuration.

Further, as shown in FIGS. 1 and 2, the inner magnet 31 is magnetized along the axial direction of the ring shape, i.e., the axial direction of the reference axis C. In this embodiment, the inner magnet 31 is magnetized in the opposite direction of the outer magnet 12. That is, the inner magnet 31 is magnetized such that the upper side is the N pole, and the lower side is the S pole.

Examples of the inner magnet 31 to be used include a permanent magnet formed of any magnetic material, such as a ferrite magnet, an alnico magnet, or a neodymium magnet. As the inner magnet 31, the same types of permanent magnets as the outer magnet 12 may be used, or different types of permanent magnets may be used.

The pole piece 32 has a ring shape and is formed such that the reference axis C is the central axis. The pole piece 32 is disposed on the upper side of the inner magnet 31. The outer diameter of the pole piece 32 is larger than the outer diameter of the inner magnet 31 and is smaller than the diameter of the opening 17 of the outer assembly 10. The inner diameter of the pole piece 32 has a size equal to the inner diameter of the inner magnet 31.

In this embodiment, the thickness of the pole piece 32 and the thickness of the outer plate 13 of the outer assembly 10 are designed to be equal to each other in the vertical direction. Further, the position of the pole piece 32 and the position of the outer plate 13 are designed to be equal to each other in the vertical direction.

That is, in the vertical direction, the upper surface of the pole piece 32 and the upper surface of the outer plate 13 are at positions equal to each other. Further, in the vertical direction, the lower surface of the pole piece 32 and the lower surface of the outer plate 13 are at positions equal to each other. It goes without saying that the present technology is not limited to such a configuration.

The pole piece 32 is a soft magnetic body and is formed of any soft magnetic material such as iron. Thus, the pole piece 32 is magnetically connected to the inner magnet 31. The pole piece 32 is disposed for magnetic induction and functions as a component constituting a magnetic circuit. That is, the pole piece 32 functions as a yoke.

The inner yoke 33 has a ring shape and is formed such that the reference axis C is the central axis. The inner yoke 33 is disposed on the lower side of the inner magnet 31. The outer diameter of the inner yoke 33 is larger than the diameter of the opening 17 of the outer assembly 10. Thus, the outer diameter of the inner yoke 33 is larger than the outer diameter of the inner magnet 31.

As shown in FIG. 1, the inner yoke 33 is connected to the bottom portion 16 of the housing 11 of the outer assembly 10. Specifically, the bottom portion 16 and the inner yoke 33 are connected to each other so as to close the opening 17 formed in the bottom portion 16.

In this embodiment, a connecting portion 34 to be connected to the bottom portion 16 (opening 17) is formed at the outer peripheral portion of the inner yoke 33. For example, a step, a chamfered surface, or the like is formed as the connecting portion 34. This makes it possible to improve the accuracy of alignment between the outer assembly 10 and the inner assembly 30 and to ensure coaxiality. Of course, the connecting portion may be configured at the bottom portion 16 (opening 17) in place of or in addition to the outer peripheral portion of the inner yoke 33.

The inner diameter of the inner yoke 33 is a size equal to the inner diameter of the inner magnet 31. Thus, a through-hole 35 extending along the axial direction at the position of the central axis of the inner magnet 31 (position of the reference axis C) is configured by the central holes of the inner magnet 31, the pole piece 32, and the inner yoke 33.

The inner yoke 33 is a soft magnetic body and is formed of any soft magnetic material such as iron. Thus, the inner yoke 33 is magnetically connected to the inner magnet 31. The inner yoke 33 is disposed for magnetic induction and functions as a component constituting a magnetic circuit.

The vibrating plate assembly 50 includes a vibrating plate 51, the voice coil 52, and a diaphragm ring 53. The vibrating plate 51 vibrates by the amplified output of sound signals and has a function of emitting sound waves into space. The vibrating plate 51 is also referred to as a diaphragm.

The vibrating plate 51 has a circular outer shape with the position of the reference axis C as the center when viewed from the reference axis C. The vibrating plate 51 is formed of any easily deformable material such as polyethylene terephthalate (PET) or a liquid crystal polymer.

The voice coil 52 is connected to the vibrating plate 51 to vibrate the vibrating plate 51 on the basis of the amplified output of the sound signals. The voice coil 52 has a cylindrical shape and is formed such that the reference axis C is the central axis. As shown in FIG. 3, when viewed in the axial direction of the reference axis C, the voice coil 52 is positioned in the gap G1 between the outer magnet 12 and the inner magnet 31. The number of turns of the voice coil 52, the material of the wire, or the like is not limited, and any configuration may be employed.

The diaphragm ring 53 is used as a member for supporting the vibrating plate 51. Providing the diaphragm ring 53 makes it possible to improve the handling of the vibrating plate 51. The diaphragm ring 53 has a ring shape and is formed such that the reference axis C is the central axis. The diaphragm ring 53 is connected to the vibrating plate 51 so as to support the peripheral portion of the vibrating plate 51.

Further, as shown in FIG. 1, the diaphragm ring 53 is connected to the upper side of the housing 11 of the outer assembly 10. In this embodiment, any nonmagnetic body such as brass is used as the diaphragm ring 53. Note that the diaphragm ring 53 can also be caused to function as a spacer.

In this embodiment, the outer assembly 10 and the inner assembly 30 are assembled, so that a magnetic circuit is constituted. Specifically, the outer magnet 12 and the outer plate 13 of the outer assembly 10, and the inner magnet 31, the pole piece 32, and the inner yoke 33 of the inner assembly 30 constitute a magnetic circuit.

Further, a magnetic gap is formed between the outer assembly 10 and the inner assembly 30. Specifically, the gap G1 between the outer magnet 12 and the inner magnet 31, and a gap G2 between the outer plate 13 and the pole piece 32 function as magnetic gaps. The vibrating plate assembly 50 is assembled such that the voice coil 52 is disposed between the magnetic gaps.

In this embodiment, each member of the outer assembly 10, each member of the inner assembly 30, and each member of the vibrating plate assembly 50 are configured coaxially with the reference axis C as a reference. Thus, as shown in FIG. 3, the position of the central axis of the outer magnet 12, the position of the central axis of the inner magnet 31, and the position of the central axis of the voice coil 52 are configured to be equal to each other.

Further, as shown in FIG. 3, when viewed from the axial direction of the reference axis C, an outer peripheral surface 12*a* and an inner peripheral surface 12*b* of the outer magnet 12, an outer peripheral surface 52*a* and an inner peripheral surface 52*b* of the voice coil 52, and an outer peripheral surface 31*a* and an inner peripheral surface 31*b* of the inner magnet 31 are concentric with each other. Two permanent magnets of the outer magnet 12 and the inner magnet 31 sandwich the voice coil 52 therebetween, so that a very strong magnetic circuit can be constituted.

The through-hole 35, which is formed in the inner assembly 30 and extends along the axial direction, is positioned on the lower side of the center of the vibrating plate 51 of the vibrating plate assembly 50. Thus, it is possible to discharge the back pressure of the vibrating plate 51 from within the speaker 100 and to improve the acoustic characteristics.

Further, as shown in FIG. 1, in this embodiment, a first portion 33*a* corresponding to the lower side of the voice coil 52 and a second portion 33*b* corresponding to the lower side of the inner magnet 31 are defined for the inner yoke 33 of the inner assembly 30. The thickness of the first portion 33*a* is designed to be smaller than the thickness of the second portion 33*b*. This is a configuration found by focusing on the fact that the first portion 33*a* is less susceptible to magnetic saturation than the second portion 33*b*.

Reduction in the thickness of the first portion 33*a* corresponding to the voice coil 52 makes it possible to increase the movable range of the voice coil 52 and to improve the acoustic characteristics.

Note that the application of the present technology is not limited to the configuration illustrated in FIGS. 1 to 3. Further, in the present disclosure, the circular shape includes not only a true circular shape but also an elliptical shape and the like. For example, if the shape of the outer magnet 12, the voice coil 52, and the inner magnet 31 when viewed from the reference axis C is any shape other than an elliptical shape and the like, the present technology can also be applied.

In this embodiment, the outer assembly 10 corresponds to an outer component portion. The inner assembly 30 corresponds to an inner component portion. The vibrating plate assembly 50 corresponds to a vibrating plate component portion. Each component portion may be referred to as a unit or a module.

Further, in this embodiment, the voice coil 52 corresponds to a coil. Further, the upper side corresponds to a first side that is the side on which the vibrating plate component portion is connected to the outer component portion. Further, the lower side corresponds to a second side opposite to the first side. Further, the first portion 33*a* of the inner yoke 33 is a portion corresponding to the voice coil 52 when viewed from the axial direction of the reference axis C. The second portion 33*b* of the inner yoke 33 is a portion corresponding to the inner magnet 31 when viewed from the axial direction of the reference axis C. The first portion and the second portion may be referred to as a portion overlapping the voice coil 52 and a portion overlapping the inner magnet 31, respectively, when viewed from the axial direction of the reference axis C.

Further, the outer assembly 10 and the inner assembly 30 may also be referred to as an outer magnetic circuit assembly and an inner magnetic circuit assembly, respectively. Additionally, when the speaker 100 itself is regarded as an assembly, the outer assembly 10, the inner assembly 30, and the vibrating plate assembly 50 can also be considered as subassemblies. For example, the outer assembly 10, the inner assembly 30, and the vibrating plate assembly 50 can also be referred to as an outer magnetic circuit subassembly, an inner magnetic circuit subassembly, and a vibrating plate subassembly, respectively.

[Method of Manufacturing Speaker]

FIGS. 4 to 7 are schematic diagrams for describing an example of a method of manufacturing the speaker 100.

Figure 4:
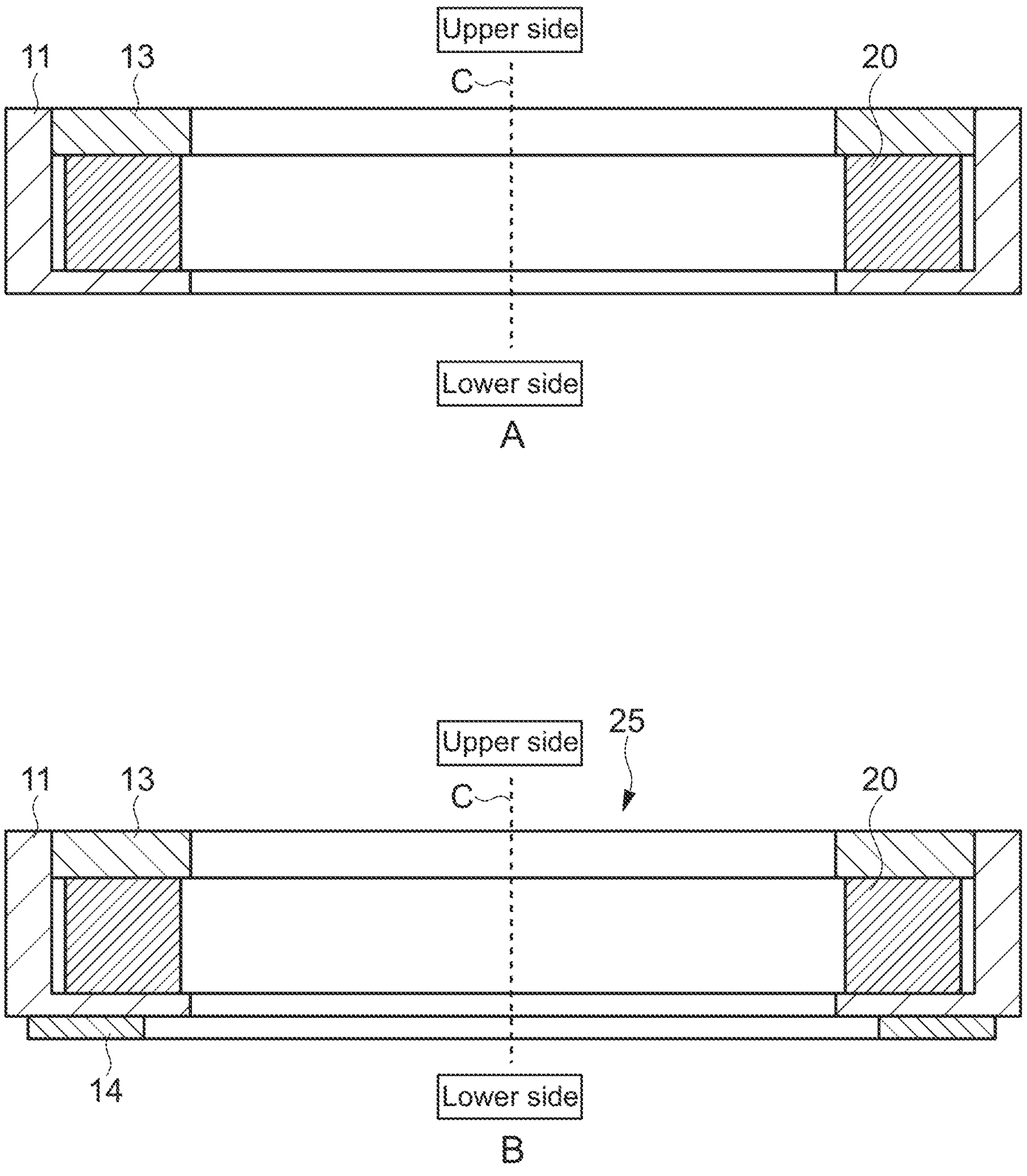
FIG. 4 is a schematic diagram for describing an example of a method of manufacturing a speaker.

As shown in A of FIG. 4, the housing 11, a ferrimagnetic body 20, and the outer plate 13 are assembled with the reference axis C as a reference. The ferrimagnetic body 20 is a component to be the outer magnet 12 shown in FIG. 1 or the like when being magnetized. Hereinafter, the ferrimagnetic body functioning as a permanent magnet when being magnetized will be described as an unmagnetized magnet. Therefore, the ferrimagnetic body 20 shown in FIG. 4 will be hereinafter described as the unmagnetized outer magnet 20 by using the same reference numeral.

Note that the method of assembling each member is not limited. Any connection method corresponding to the material of the member or the like, such as bonding using an adhesive or the like, welding, or bonding using a screw or the like, may be employed. This also applies to the following assembling steps.

As shown in B of FIG. 4, the terminal plate 14 is connected to the lower side of the housing 11. Thus, as compared with the outer assembly 10 shown in B of FIG. 2, the configuration in which the outer magnet 12 is in the unmagnetized state is provided.

Hereinafter, the assembly in which the unmagnetized outer magnet 20 shown in B of FIG. 4 is incorporated will be described as an unmagnetized outer assembly 25. Thus, it can be said that B of FIG. 4 is a diagram showing the step of forming the unmagnetized outer assembly 25.

For example, in the unmagnetized outer assembly 25 shown in B of FIG. 4, the unmagnetized outer magnet 20 is magnetized. This completes the step of forming the outer assembly 10 according to this embodiment.

Note that in the outer plate 13 formed of a soft magnetic body and the unmagnetized outer magnet 20 formed of a ferrimagnetic body, the unmagnetized outer magnet 20 has lower processing accuracy in many cases. Therefore, the outer dimension of the outer plate 13 is designed to be larger than the outer dimension of the unmagnetized outer magnet 20 when viewed from the axial direction of the reference axis C. This makes it possible to improve the workability of the step of forming the unmagnetized outer assembly 25.

The terminal plate 14 may be provided in another assembly. The terminal plate 14 may be provided at any position as long as it does not affect the assembly of the inner assembly 30. For example, it is also possible to form the terminal plate 14 using a flexible substrate or the like on the side surface of the housing 11.

As a step different from the step of forming the unmagnetized outer assembly 25, the vibrating plate assembly 50 shown in A of FIG. 2 is formed. That is, the diaphragm ring 53 is connected to the vibrating plate 51. Further, the voice coil 52 is connected to the vibrating plate 51. The specific method of forming the vibrating plate assembly 50 is not limited, and any method may be employed.

Figure 5:
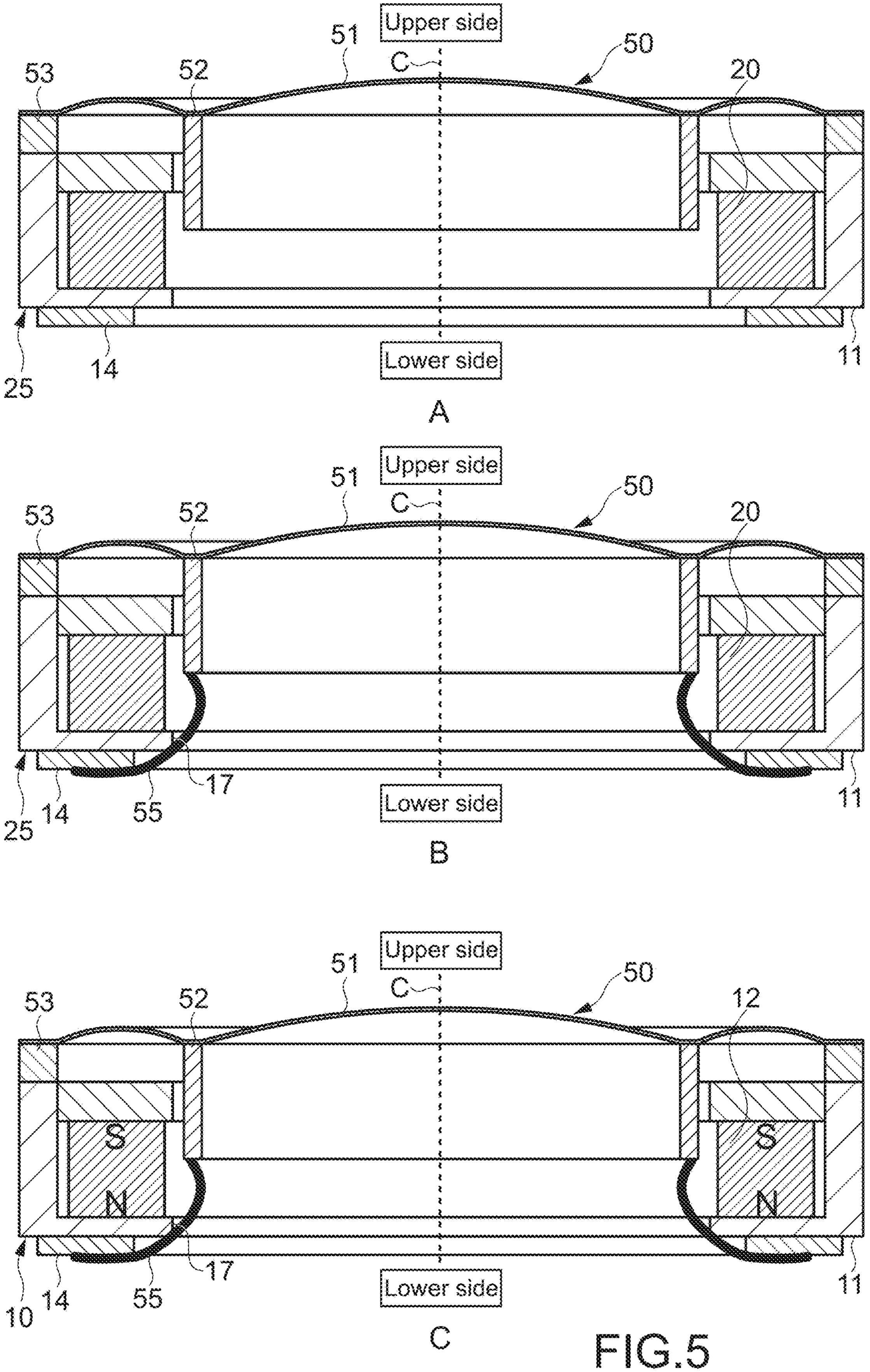
FIG. 5 is a schematic diagram for describing an example of a method of manufacturing a speaker.

As shown in A of FIG. 5, the unmagnetized outer assembly 25 and the vibrating plate assembly 50 are assembled. Specifically, the diaphragm ring 53 of the vibrating plate assembly 50 is connected to the upper side of the housing 11 with the reference axis C as a reference.

As shown in B of FIG. 5, a lead wire 55 of the voice coil 52 of the vibrating plate assembly 50 is extracted to the outside through the opening 17 of the unmagnetized outer assembly 25. The lead wire 55 is then fixed to the terminal plate 14 by soldering.

As shown in C of FIG. 5, the unmagnetized outer magnet 20 is magnetized along the axial direction of the reference axis C. Thus, the outer magnet 12 shown in FIGS. 1 and 2 is provided. The outer assembly 10 shown in FIGS. 1 and 2 is also provided.

That is, in this embodiment, the step of forming the outer assembly 10 includes: the step of assembling the unmagnetized outer assembly 25 and the vibrating plate assembly 50; the step of fixing the lead wire 55 of the voice coil 52 of the vibrating plate assembly 50 by soldering; and the step of magnetizing the unmagnetized outer magnet 20, in the stated order.

Before magnetization of the outer magnet 12 (when it is the unmagnetized outer magnet 20), the soldering of the lead wire 55 can be performed, which makes it possible to greatly improve the workability of soldering.

As a step different from the steps described with reference to FIGS. 4 and 5, the inner assembly 30 shown in C of FIG.

2 is formed. That is, the inner magnet 31, the pole piece 32, and the inner yoke 33 are assembled with the reference axis C as a reference.

In this embodiment, in the step of forming the inner assembly 30, the inner magnet 31 having a ring shape with a smaller diameter than the outer magnet 12 is prepared. The through-hole 35 is then formed at the position of the central axis of the inner magnet 31 so as to extend along the axial direction. Specifically, the inner magnet 31, the pole piece 32, and the inner yoke 33, which have a ring shape with an equal inner diameter, are assembled such that the central axes thereof are at an equal position. Thus, the through-hole 35 is formed.

Note that the present technology is not limited to the case where all of the inner magnet 31, the pole piece 32, and the inner yoke 33 have a ring shape with an equal inner diameter. Even if the inner diameters of the respective components are not equal to each other, it is possible to form a through-hole extending along the axial direction at the position of the reference axis C.

Further, in the pole piece 32 formed of a soft magnetic body and the inner magnet 31 formed of a ferrimagnetic body, the inner magnet 31 has lower processing accuracy in many cases. Therefore, the outer dimension of the pole piece 32 is designed to be larger than the outer dimension of the inner magnet 31 when viewed from the axial direction of the reference axis C. This makes it possible to improve the workability of the step of forming the inner assembly 30.

Figure 6:
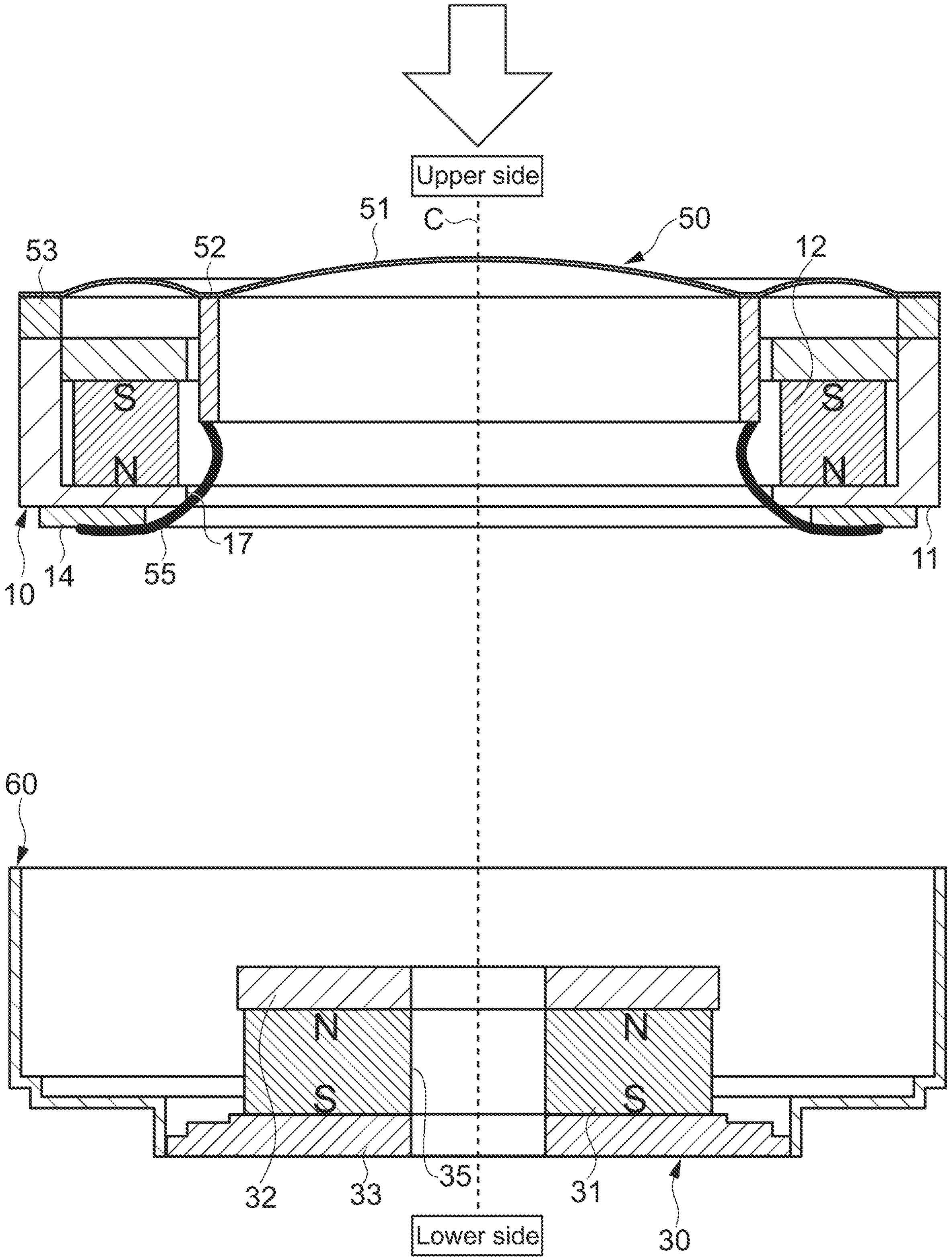
FIG. 6 is a schematic diagram for describing an example of a method of manufacturing a speaker.
Figure 7:
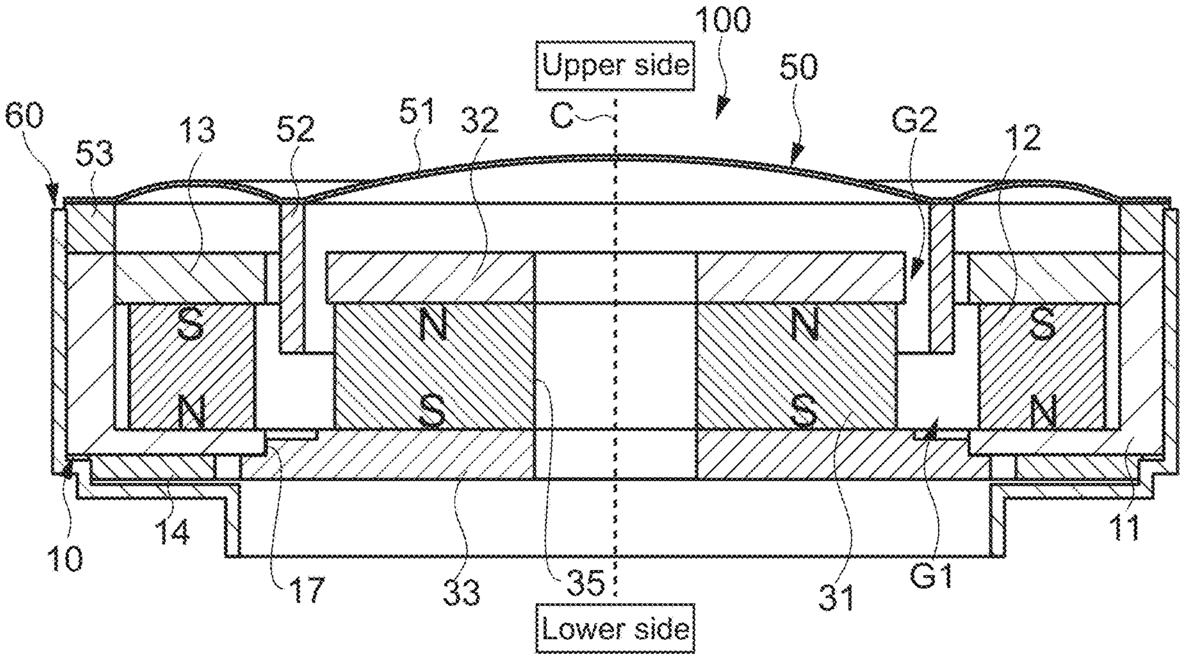
FIG. 7 is a schematic diagram for describing an example of a method of manufacturing a speaker.

As shown in FIGS. 6 and 7, the outer assembly 10 and the inner assembly 30 are assembled. In this embodiment, the inner assembly 30 is assembled in the outer assembly 10 in which the vibrating plate assembly 50 is assembled.

The outer assembly 10 and the inner assembly 30 are assembled such that the inner magnet 31 is disposed inside the outer magnet 12 through the gap G1 and such that the magnetizing direction of the outer magnet 12 and the magnetizing direction of the inner magnet 31 are opposite to each other. The outer assembly 10 and the inner assembly 30 are also assembled such that the voice coil 52 is disposed in the magnetic gap between the outer assembly 10 and the inner assembly 30.

In this embodiment as shown in FIG. 6, a jig 60 for equalizing the axial direction of the outer magnet 12 and the axial direction of the inner magnet 31 is used. It can also be said that the jig 60 is a device for ensuring that the outer assembly 10 and the inner assembly 30 are coaxial (coaxiality).

As shown in FIG. 6, the inner assembly 30 is supported by the jig 60. The outer assembly 10 in which the vibrating plate assembly 50 is assembled is inserted into the jig 60. Thus, as shown in FIG. 7, the outer assembly 10 and the inner assembly 30 are assembled in the jig 60 accurately so as to be coaxial with the reference axis C as a reference. The jig 60 is removed, and thus the speaker 100 shown in FIG. 1 is manufactured.

Note that when the outer assembly 10 and the inner assembly 30 are assembled, the inner magnet 31 is inserted into the opening 17, of the outer assembly 10, formed on the lower side opposite to the upper side to which the vibrating plate assembly 50 is connected. The inner magnet 31 inserted from the lower side is then fixed. As described above, the method of manufacturing the speaker 100 according to this embodiment includes the step of inserting the inner magnet 31 into the opening 17 formed in the outer assembly 10.

The specific configuration of the jig 60, the assembly method using the jig 60, or the like is not limited, and any configuration and assembly method may be employed. For example, the outer assembly 10 may be supported by the jig 60, and the inner assembly 30 may be inserted into the jig 60. Of course, both the outer assembly 10 and the inner assembly 30 may be supported by the jig 60.

When the speaker 100 is manufactured using the jig 60, the width of the magnetic gap becomes uniform in the circumferential direction, and it is possible to provide a very high output characteristics and acoustic characteristics.

Note that the outer assembly 10 and the inner assembly 30 may be assembled without using the jig 60. In addition, in the other steps described above, a jig for ensuring the coaxial position may be used as appropriate.

Note that the illustration of the lead wire 55 is omitted in FIG. 7. The lead wire 55 is, for example, extracted through an extracting groove or the like formed in the housing 11 or the inner yoke 33. Alternatively, a space for extracting the lead wire 55 may be formed between the housing 11 and the inner yoke 33. In addition, any configuration for extracting the lead wire 55 may be employed.

Further, the magnetization directions illustrated in FIGS. 1, 2, and 5 to 7 are merely examples, and the magnetization direction of the inner magnet 31 and the magnetization direction of the outer magnet 12 only need to be the opposite directions. That is, the outer magnet 12 may be magnetized such that the upper side is the N pole and the lower side is the S pole. In this case, the inner magnet 31 is magnetized such that the upper side is the S pole and the lower side is the N pole.

The method of manufacturing the speaker 100 is not limited to the method described with reference to FIGS. 4 to 7. For example, the vibrating plate assembly 50, the outer assembly 10, and the inner assembly 30 shown in FIG. 2 are formed individually. Subsequently, the outer assembly 10, the inner assembly 30, and the vibrating plate assembly 50 may be assembled such that the voice coil 52 is disposed in the magnetic gap between the outer assembly 10 and the inner assembly 30.

In addition, for example, any manufacturing method may be employed, which includes the step of assembling the outer assembly 10 and the inner assembly 30 such that the inner magnet 31 is disposed inside the outer magnet 12 through a gap and such that the magnetizing direction of the outer magnet 12 and the magnetization direction of the inner magnet 31 are opposite to each other.

Hereinabove, in the speaker 100 according to this embodiment, the inner magnet 31 magnetized in the direction opposite to the direction of the outer magnet 12 is disposed inside the ring-shaped outer magnet 12 via the gap G1. This makes it possible to achieve a speaker 100 including a strong magnetic circuit.

Electroacoustic transducers (speakers) have multiple basic structures and systems. Among others, electrodynamic speakers are widely used for consumer and professional use because of a sound pressure to be generated and the feasibility. The basic structure of the electrodynamic speaker includes a magnetic circuit using a permanent magnet, a vibrating plate, and a voice coil attached to the vibrating plate and suspended in the magnetic gap (it does not matter whether attachment to the vibrating plate is performed by a direct method, a method via a bobbin, or the like).

When an electrical signal flows through the voice coil, the voice coil moves according to Fleming's left hand rule. This moving force becomes stronger in proportion to the magnetic flux density in the magnetic gap. Here, when attention is focused on the configuration of the magnetic circuit, either of the two methods of the inner magnetic type and the outer magnetic type as described in Patent Literatures 1 and 2 is often employed.

Here, the inventors repetitively examined the combination use of both the configurations of the inner magnetic type and the outer magnetic type for the purpose of obtaining a stronger magnetic flux density. When the inner magnetic type and the outer magnetic type are used in combination, in order to provide a configuration in which the thickness of the entire magnetic circuit is suppressed, the following configuration is advantageous, in which the two magnets are at the same position in the positional relationship parallel to the magnetic gap, and the magnetizing directions thereof are opposite to each other.

When such a configuration is employed, the step of performing magnetization after assembling the entire speaker and the magnetic circuit is very difficult to perform. Thus, at least one permanent magnet needs to be assembled after magnetization. Further, it is necessary to fix the lead wire of the voice coil to the terminal plate after assembling the vibrating plate. However, performing the step of soldering in the immediate vicinity of the permanent magnet after magnetization is likely to cause a decrease in workability and a decrease in magnetic flux density due to demagnetization of the permanent magnet.

As a result of such examinations, the inventors have newly devised each of the techniques described above. That is, the outer magnet 12 and the inner magnet 31 having different magnetizing directions are disposed on the back surface of the vibrating plate 51. In this case, the outer assembly 10 including the outer magnet 12, and the inner assembly 30 including the inner magnet 31 are formed as separate bodies. This makes it possible to perform assembling after magnetizing the permanent magnet.

When the two permanent magnets having different magnetizing directions are equipped, the magnetic circuit becomes strong as compared with that using a single magnet, and sensitivity, braking of the low range, or the like is improved. In addition, when an attempt is made to obtain the same magnetic force as in the case of using a single magnet, the magnetic gap can be widened, and the risk of abnormal noise of voice coil collision can be reduced. Further, when each magnet is thinned, it is possible to reduce the thickness and size of the speaker while providing an equivalent magnetic flux density.

In addition, in a state before the inner assembly 30 is assembled, a sufficient space can be ensured for performing operations such as forming, fixing, and the like of the lead wire 55 when a signal is input to the voice coil 52 from the outside. Thus, it is possible to route the lead wire 55 from the opposite side of the vibrating plate 51 to the outside of the magnetic circuit.

As a result, workability for extracting the lead wire 55 is improved, and the excess length of the lead wire 55 can also be set to be appropriate. Thus, it is possible to optimize the strength when material of the wire is a spring and to improve the sound quality. In addition, since reduction in risk of contact with other components can be reduced, it is possible to suppress quality problems such as generation of abnormal noise and disconnection of the voice coil 52.

Further, since it is possible to achieve a strong magnetic circuit by using the present technology, it is possible to reduce the amount (size) of magnets necessary for achieving the desired magnetic flux density. Therefore, it is possible to increase the diameter of the through-hole 35 made by scraping the inner magnet 31 and thus to increase the design range of the through-hole 35. As a result, it becomes possible to adjust the acoustics related to the back pressure of the vibrating plate 51 to be more suitable, thereby making it possible to improve the acoustic characteristics.

Use of the present technology makes it possible to achieve further miniaturization of small speakers such as earphones and headphones, improvement in acoustic characteristics, improvement in output characteristics, or the like. Of course, the present technology can be applied to not only small speakers but also any medium-sized and large-sized speakers. For example, it is possible to achieve a speaker having high acoustic characteristics and high output characteristics while having the same size as a speaker conventionally used.

Second Embodiment

A speaker according to a second embodiment of the present technology will be described. In the following description, description of the configurations and effects similar to those in the speaker 100 described in the above embodiment will be omitted or simplified.

Figure 8:
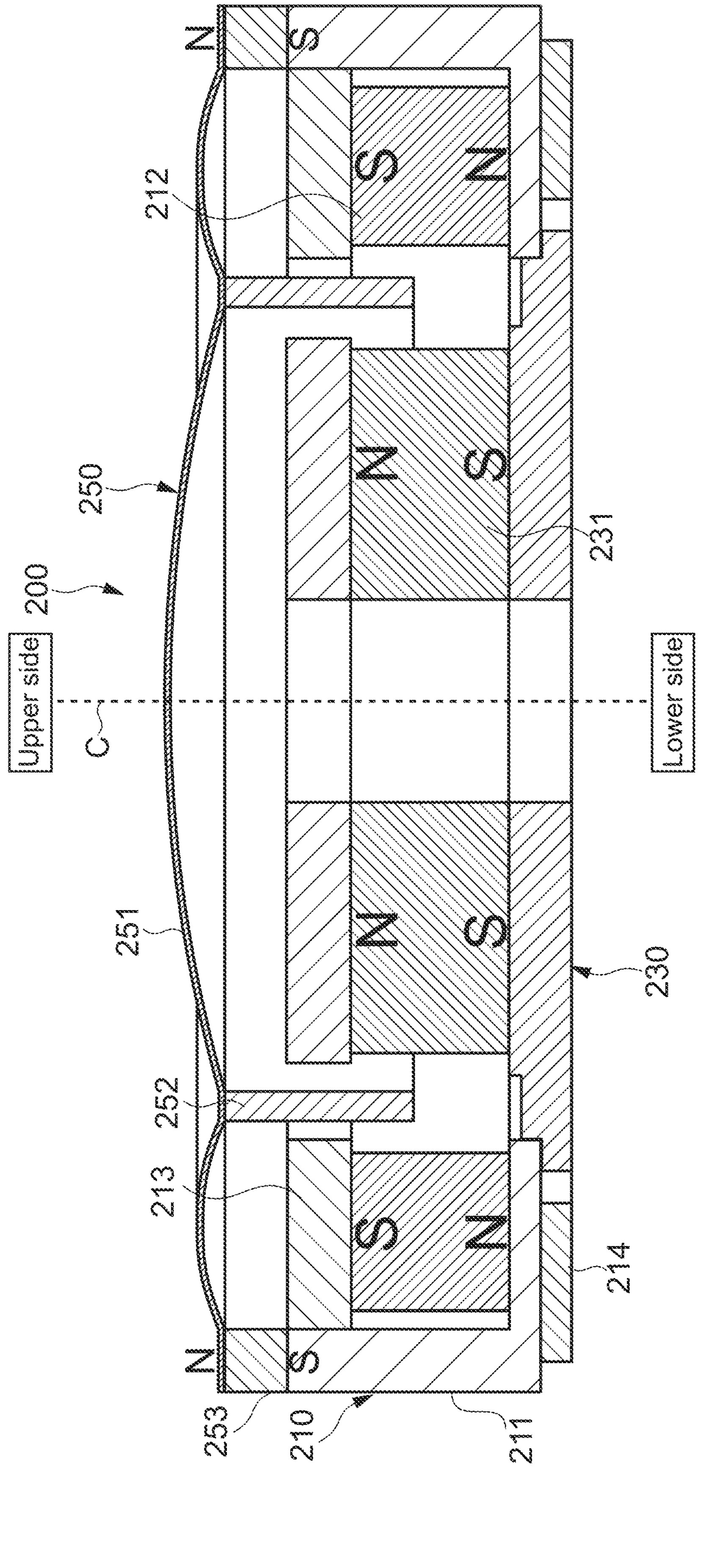
FIG. 8 is a schematic cross-sectional view showing a configuration example of a speaker according to a second embodiment.
Figure 9:
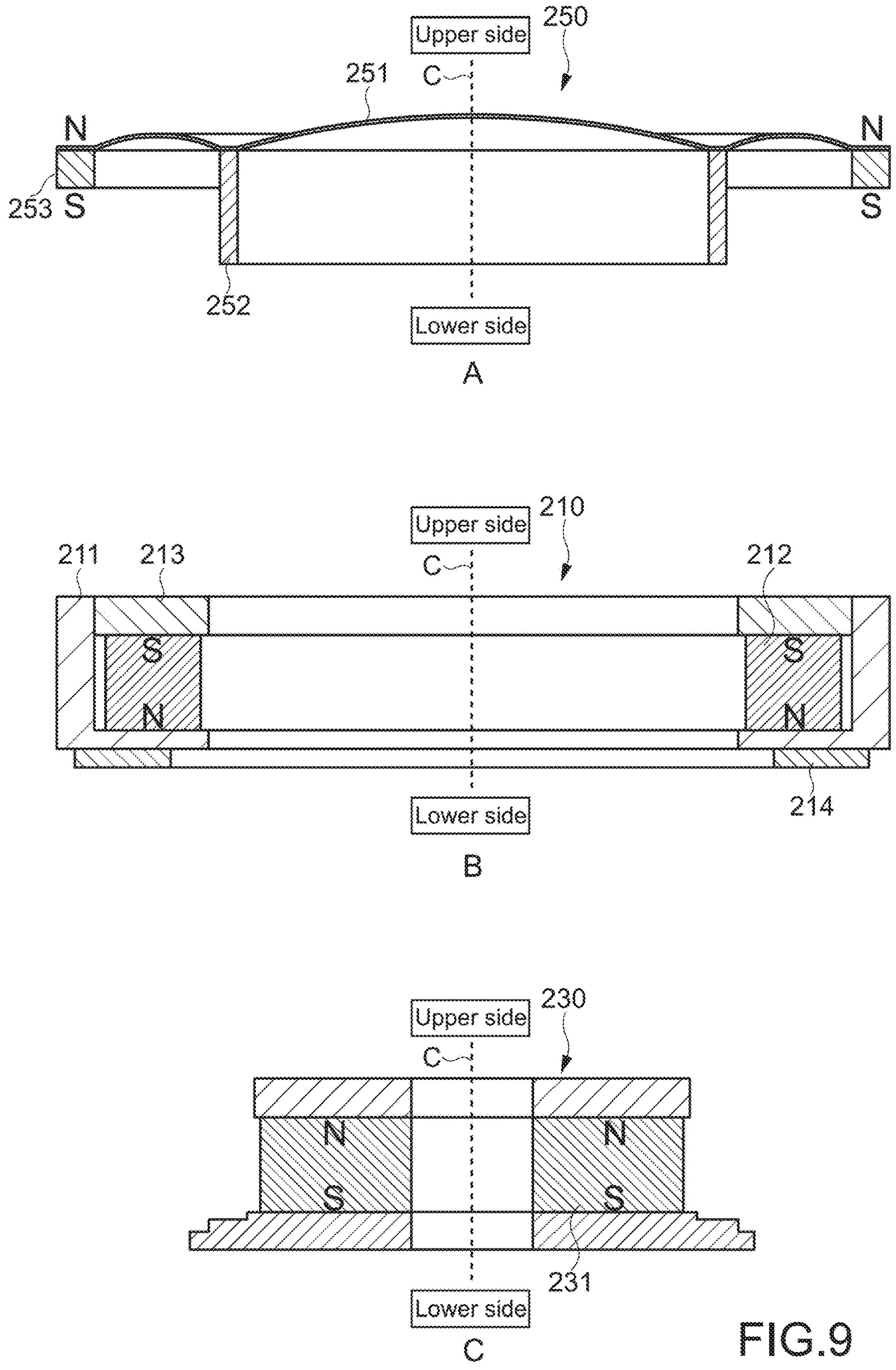
FIG. 9 is a schematic cross-sectional view individually showing an outer assembly, an inner assembly, and a vibrating plate assembly included in the speaker.

FIG. 8 is a schematic cross-sectional view showing a configuration example of a speaker 200 according to this embodiment. FIG. 9 is a schematic cross-sectional view individually showing an outer assembly 210, an inner assembly 230, and a vibrating plate assembly 250 included in the speaker 200.

In this embodiment, a diaphragm ring 253 of the vibrating plate assembly 250 is formed of a magnetic body and is magnetized. That is, the diaphragm ring 253 is formed of a permanent magnet. The specific magnetic material or the like constituting the diaphragm ring 253 is not limited.

As shown in FIG. 8, the diaphragm ring 253 is magnetized in the direction opposite to a direction of an outer magnet 212 along the axial direction of the reference axis C. That is, the diaphragm ring 253 is magnetized in the same direction as an inner magnet 231. The diaphragm ring 253 is then connected to the upper side of a housing 211 of the outer assembly 210. In this embodiment, the diaphragm ring 253 corresponds to a support magnet.

As the method of manufacturing the speaker 200 according to this embodiment, for example, the vibrating plate assembly 250, the outer assembly 210, and the inner assembly 230 shown in FIG. 9 are individually formed. That is, the diaphragm ring 253 of the vibrating plate assembly 250, the outer magnet 212 of the outer assembly 210, and the inner magnet 231 of the inner assembly 230 are individually magnetized.

The outer assembly 210 and the vibrating plate assembly 250 are then assembled, and then the inner assembly 230 is assembled. In each assembly step, a jig may be used for the purpose of preventing positional deviation. Note that soldering is performed after the outer assembly 210 and the vibrating plate assembly 250 are assembled.

Figure 10:
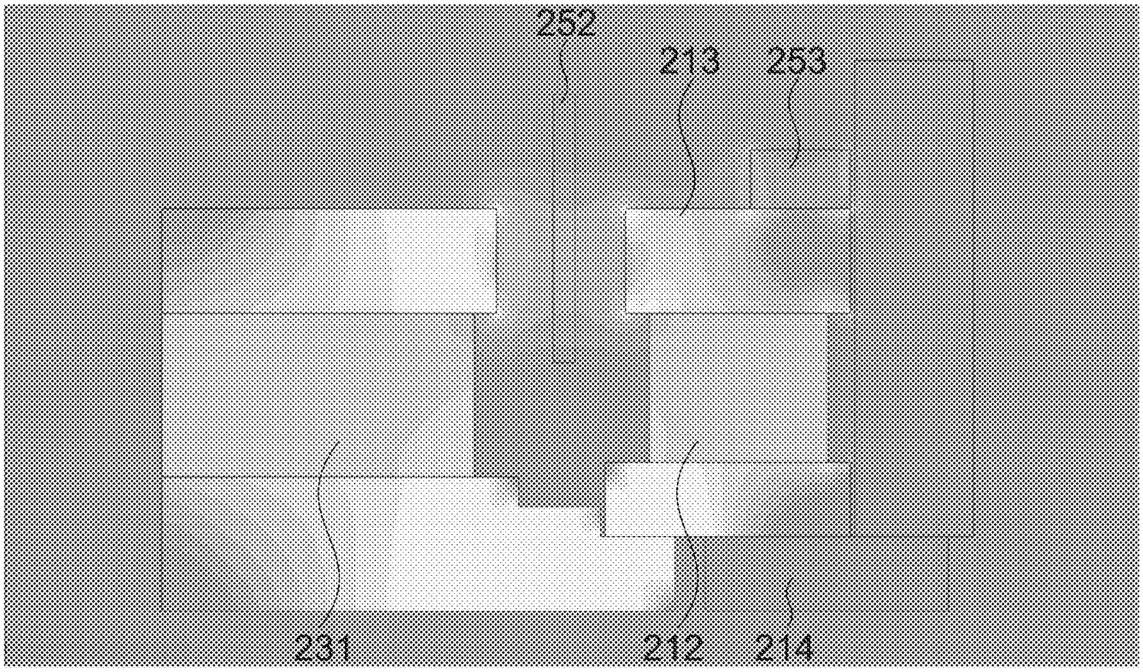
FIG. 10 is a schematic diagram showing the distribution of a magnetic flux density in a magnetic gap.
Figure 10:
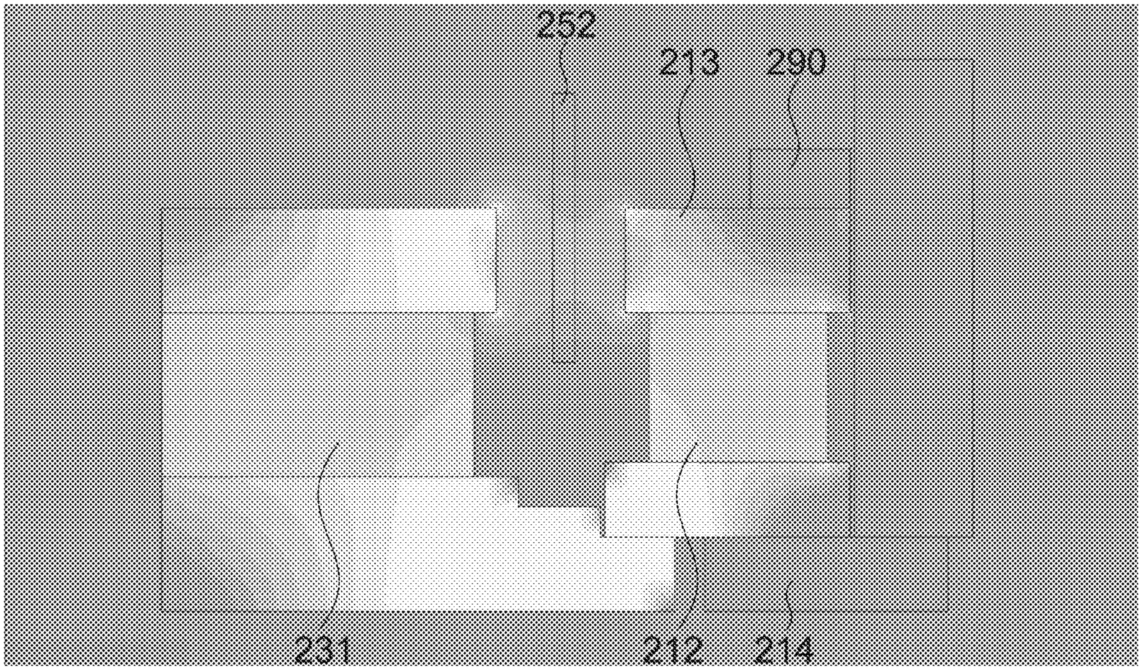

FIG. 10 is a schematic diagram showing the distribution of the magnetic flux density in the magnetic gap. FIG. 10 shows the distribution in a portion of one side (right side) on the cross section having the laterally symmetrical shape with the reference axis C as a reference.

A of FIG. 10 shows the speaker 200 according to this embodiment and a distribution when the diaphragm ring 253 formed of a permanent magnet is used. B of FIG. 10 shows the distribution when a diaphragm ring 290 formed of brass is used. The intensity of the magnetic flux density is expressed by the shades of a gray color in A and B of FIG. 10. As the gray color becomes lighter (closer to white), the magnetic flux density increases.

As shown in FIG. 10, use of the diaphragm ring 253 formed of a permanent magnet on the outer plate 213 makes it possible to further increase the amount of magnetic flux in the magnetic gap. Further, it is possible to improve the symmetry of the distribution of the magnetic flux density between the vibrating plate 251 side (upper side) and the terminal plate 214 side (lower side) in the vicinity of the magnetic gap. As a result, it is possible to keep the magnetic flux density uniform throughout the movable range of the voice coil 252 moving along the vertical direction.

Other Embodiments

The present technology is not limited to the embodiments described above, and can achieve various other embodiments.

Figure 11:
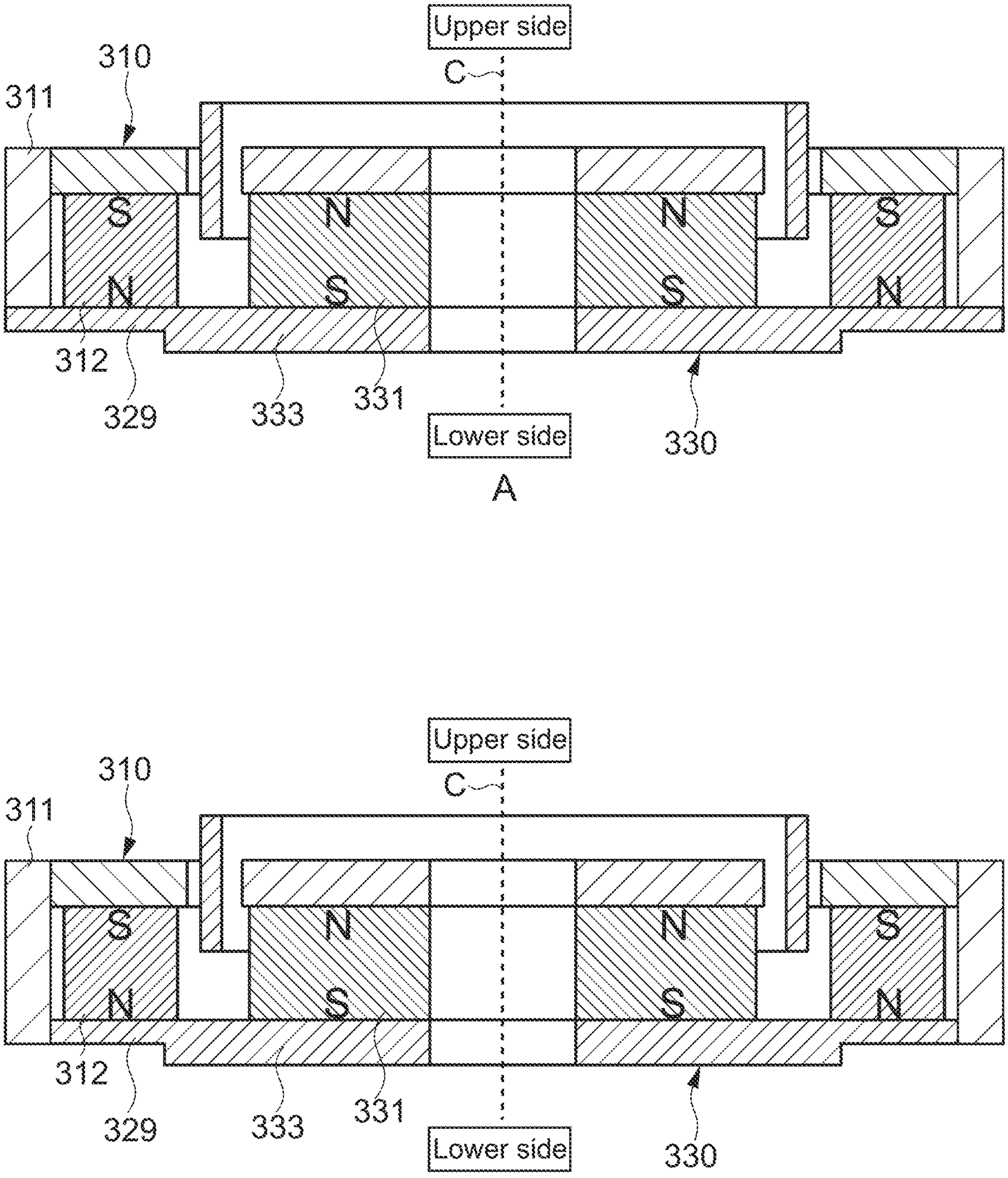
FIG. 11 is a schematic cross-sectional view showing a configuration example of a speaker according to another embodiment.

FIG. 11 is a schematic cross-sectional view showing a configuration example of a speaker according to another embodiment. As shown in A and B of FIG. 11, the shape of a housing 311 of an outer assembly 310 is formed to cover only the outer peripheral side of an outer magnet 312. An outer yoke 329 for the outer magnet 312 may be provided on the lower side of the outer magnet 312. Thus, it is possible to improve the magnetic permeability between the yokes from the outer magnet 312 to the inner magnet 331.

If the outer yoke 329 is provided as shown in A and B of FIG. 11, when the outer assembly 310 is formed, the outer yoke 329 of a metal portion is exposed to the outside. Further, when the inner assembly 330 is formed, an inner yoke 333 of a metal portion is exposed to the outside.

Therefore, when the outer assembly 310 and the inner assembly 330 are assembled, it is possible to connect the outer yoke 329 and the inner yoke 333 by welding. As a result, it is possible to increase the strength of the connecting portion between the outer assembly 310 and the inner assembly 330 and to improve the durability of the speaker.

Note that in A and B of FIG. 11, the outer yoke 329 and the inner yoke 333 are shown integrally in a state after subjected to welding. That is, the illustration of the welded portion is omitted. The position of the welded portion is not limited and may be arbitrarily designed. Of course, the method of connecting the outer yoke 329 and the inner yoke 333 is not limited to welding.

In addition, a portion functioning as the outer yoke 329 after assembling may be provided in advance to the inner yoke 333. That is, the outer yoke 329, which is a portion functioning as the outer yoke 329 after assembling, may be integrally formed with the inner yoke 333 on the outer circumferential side of the inner yoke 333 with the reference axis C as the center.

Figure 12:
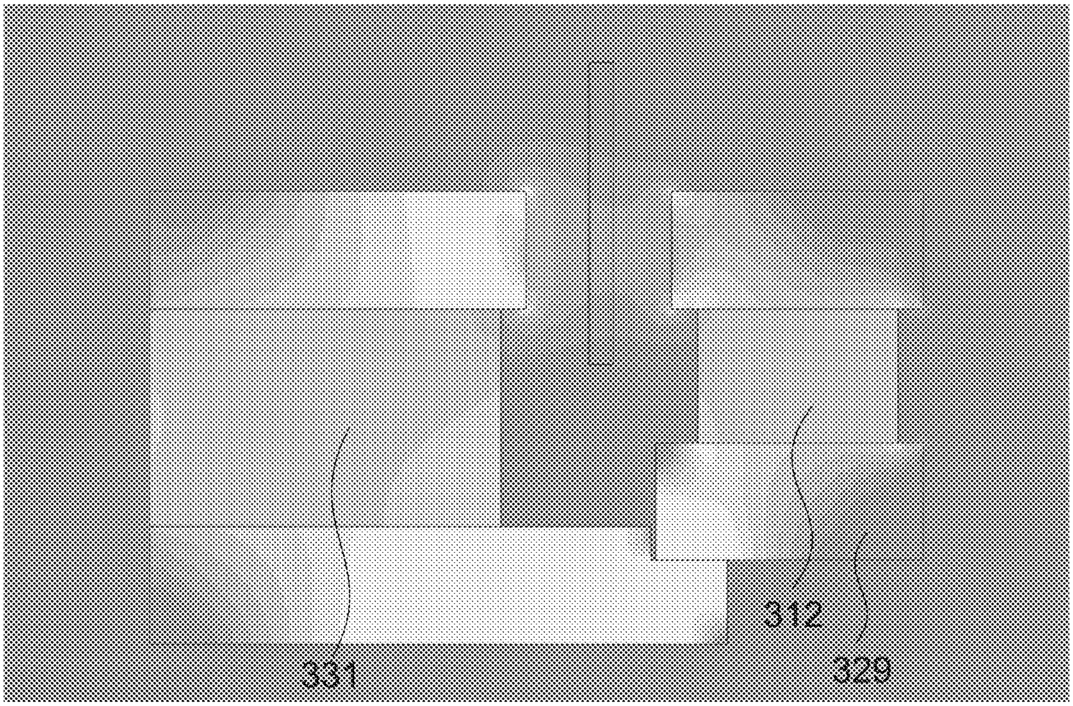
FIG. 12 is a schematic diagram showing the distribution of a magnetic flux density in a magnetic gap.
Figure 12:
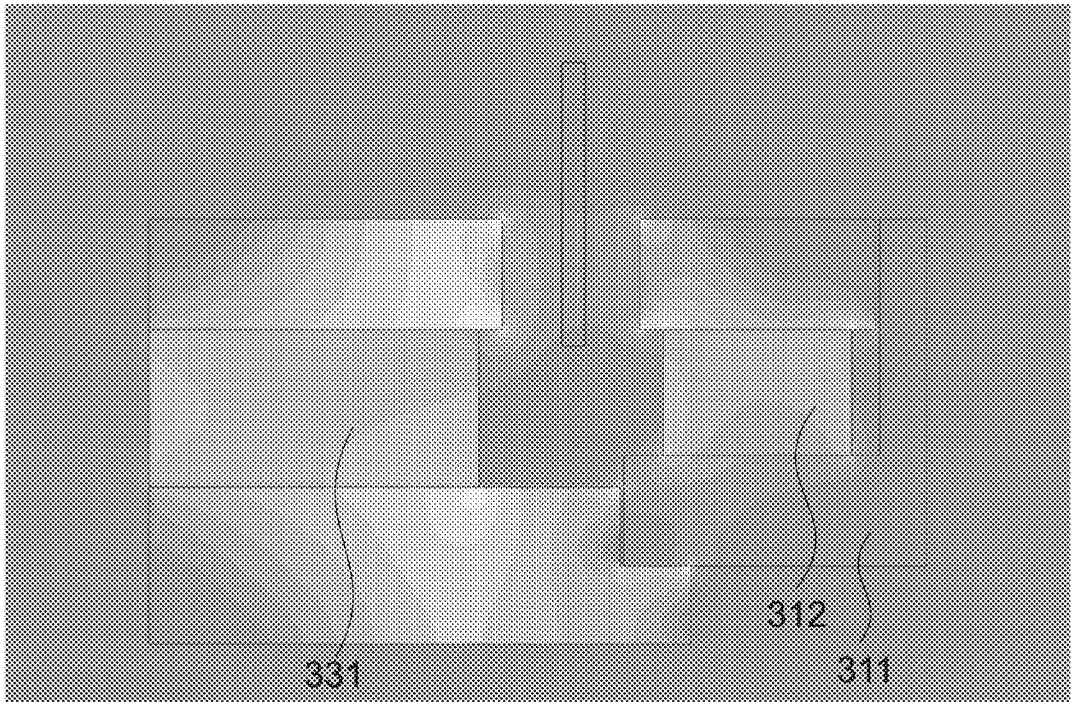

FIG. 12 is a schematic diagram showing the distribution of the magnetic flux density in the magnetic gap. A of FIG. 12 shows the distribution when the outer yoke 329 is used (the housing 311 of the outer peripheral portion is not shown). B of FIG. 12 shows the distribution when the outer yoke 329 is not used and the outer magnet 312 is supported by the housing 311.

As in A and B of FIG. 10, the intensity of the magnetic flux density is expressed by the shades of a gray color. As the gray color becomes lighter (closer to white), the magnetic flux density increases.

As shown in FIG. 12, use of the outer yoke 329 makes it possible to further increase the amount of magnetic flux in the magnetic gap. Further, it is possible to keep the magnetic flux density uniform in the vicinity of the magnetic gap.

Figure 13:
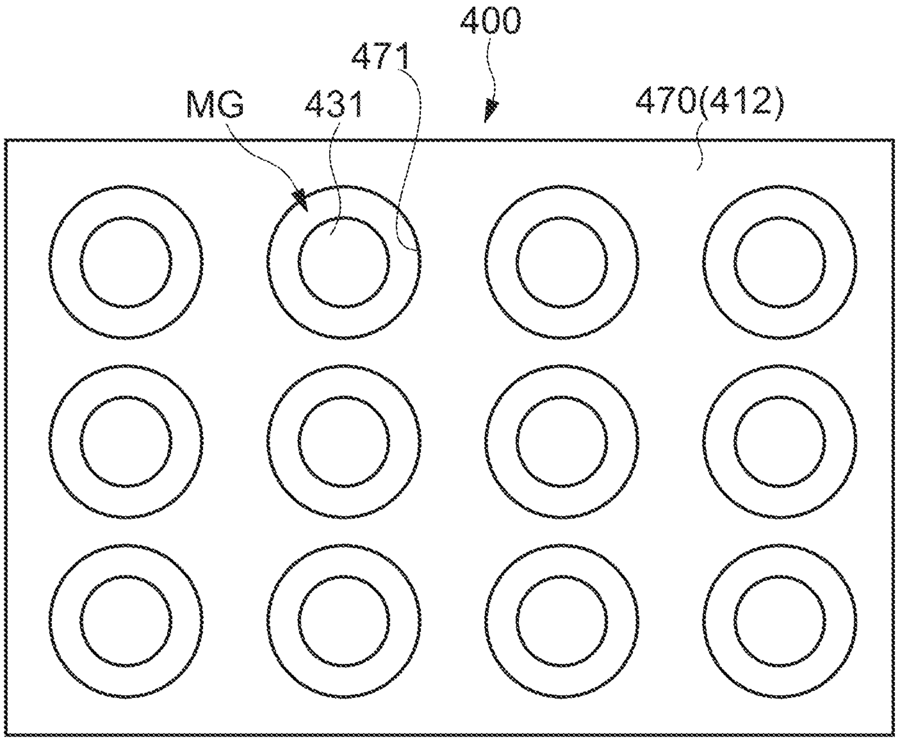
FIG. 13 is a schematic diagram showing a configuration example of a speaker unit according to another embodiment.

FIG. 13 is a schematic diagram showing a configuration example of a speaker unit 400 according to another embodiment. As shown in FIG. 13, it is also possible to dispose an outer magnet 412 to be shared by a plurality of inner magnets 431.

For example, a plurality of holes 471 is formed in a plate-shaped magnet component 470. The inner magnet 431 is disposed for each hole 471 such that a magnetic gap MG is formed. A voice coil (not shown) is disposed in the magnetic gap between the hole 471 and the inner magnet 431. Thus, the number of holes 471, the number of inner magnets 431, and the number of voice coils are equal to each other.

The plate-shaped magnet component 470 functions as the outer magnet 412 described above for each inner magnet 431. Use of the present technology makes it possible to easily achieve a speaker unit 400 including a plurality of voice coils and having a planar shape. Further, when the magnet component 470 is obtained using a component capable of curving, it is also possible to install the speaker unit 400 on a curved surface.

Of course, the magnetic component functioning as an outer plate or an outer yoke may be added to the plate-shaped magnet component 470. Alternatively, the plate-shaped magnet component 470 may implement the function of the outer plate and the function of the outer yoke.

A single vibrating plate may be used as the vibrating plate. That is, a single vibrating plate may be shared by a plurality of voice coils. Alternatively, the vibrating plate may be provided for each voice coil.

All the characteristics of the inner magnets 431 disposed in the respective holes 471 may not be the same. Further, all the winding diameters of the voice coils disposed in the respective holes 771 or the like may not be the same. That is, the speakers having different output characteristics and acoustic characteristics may be respectively configured in the respective holes 471.

Further, the inner magnets 431 and the voice coils do not necessarily need to be disposed at regular intervals, and for example, the inner magnets 431 and the voice coils are disposed to match the shape of the natural vibration of the vibrating plate. That is, it is possible to configure a desired number of speakers having desired characteristics at desired positions.

As shown in FIG. 1 or the like in the above description, the through-hole 35 extending in the axial direction is formed in the inner assembly 30. The present technology is not limited to this. Even when the through-hole 35 is not formed, the present technology is applicable. For example, even when an inner magnet 31 having a disc shape rather than a ring shape is used, the present technology is applicable.

In the above description, the case where the lead wire of the voice coil is extracted to the outside from the side opposite to the side to which the vibrating plate assembly is connected has been taken as an example. The present technology is not limited to this. The lead wire of the voice coil may be extracted from the side to which the vibrating plate assembly is connected.

Each configuration of the speaker, the outer assembly, the inner assembly, the vibrating plate assembly, and the like described with reference to the drawings, each step of the method of manufacturing the speaker, and the like are merely one embodiment, and can be arbitrarily modified without departing from the scope of the present technology. That is, any other configurations, other methods, and the like for carrying out the present technology may be employed.

In the present disclosure, concepts defining shapes, sizes, positional relationships, states, and the like, such as "central", "center", "uniform", "equal", "same", "orthogonal", "parallel", "symmetric", "extending", "axial", "columnar", "cylindrical", "ring-shaped", and "annular", include concepts including "substantially central", "substantially center", "substantially uniform", "substantially equal", "substantially same", "substantially orthogonal", "substantially parallel", "substantially symmetric", "substantially extending", "substantially axial", "substantially columnar", "substantially cylindrical", "substantially ring-shaped", "substantially annular", and the like.

For example, the states included in a predetermined range (e.g., ±10% range) based on "perfectly central", "perfectly center", "perfectly uniform", "perfectly equal", "perfectly same", "perfectly orthogonal", "perfectly parallel", "perfectly symmetric", "perfectly extending", "perfectly axial", "perfectly columnar", "perfectly cylindrical", "perfectly ring-shaped", "perfectly annular", and the like are also included.

At least two of the characteristic portions according to the present technology described above can be combined. That is, the various characteristic portions described in the embodiments may be arbitrarily combined without distinguishing between the embodiments. Further, the various effects described above are not limitative but are merely illustrative, and other effects may be provided.

Note that the present technology may also take the following configurations.

(1) A speaker, including:
an outer magnet that has a ring shape and is magnetized along an axial direction of the ring shape; and
an inner magnet that has a circular outer shape when viewed from the axial direction of the outer magnet, is magnetized in a direction opposite to a direction of the outer magnet along the axial direction, and is disposed inside the outer magnet through a gap.

(2) The speaker according (1), in which
the inner magnet has a ring shape having an axial direction equal to the axial direction of the outer magnet.

(3) The speaker according to (2), further including:
an outer component portion including the outer magnet;
an inner component portion including the inner magnet and forming a magnetic gap with the outer component portion; and
a vibrating plate component portion including a coil disposed in the magnetic gap and a vibrating plate.

(4) The speaker according to (3), in which
the outer component portion has an opening that is opened perpendicularly to the axial direction and has a diameter larger than an outer diameter of the inner magnet, and
the inner magnet is inserted into the opening and fixed.

(5) The speaker according to (4), in which
when a side on which the vibrating plate component portion is connected to the outer component portion in the axial direction is a first side, and a side opposite to the first side is a second side,
the opening is formed on the second side of the outer component portion.

(6) The speaker according to (4) or (5), in which
a lead wire of the coil is extracted to an outside through the opening.

(7) The speaker according to any one of (3) to (6), in which
a position of a central axis of the outer magnet, a position of a central axis of the inner magnet, and a position of a central axis of the coil are configured to be equal to each other, and
the inner component portion includes a through-hole extending along the axial direction at the position of the central axis of the inner magnet.

(8) The speaker according to any one of (3) to (7), in which
when a side on which the vibrating plate component portion is connected to the outer component portion in the axial direction is a first side, and a side opposite to the first side is a second side,
the inner component portion includes an inner yoke magnetically connected to the second side of the inner magnet.

(9) The speaker according to (8), in which
the inner yoke includes a first portion corresponding to the coil and a second portion corresponding to the inner magnet when viewed from the axial direction, and
a thickness of the first portion is smaller than a thickness of the second portion.

(10) The speaker according to (8) or (9), in which
the outer component portion includes an outer yoke magnetically connected to the second side of the outer magnet.

(11) The speaker according to (10), in which
the inner yoke and the outer yoke are connected to each other by welding.

(12) The speaker according to any one of (3) to (11), in which
the vibrating plate component portion includes a support magnet that supports the vibrating plate and is magnetized in a direction opposite to the direction of the outer magnet along the axial direction.

(13) A method of manufacturing a speaker, including:
forming an outer component portion including an outer magnet that has a ring shape and is magnetized along an axial direction of the ring shape;
forming an inner component portion including an inner magnet that has a circular outer shape with a diameter smaller than an inner diameter of the outer magnet and is magnetized along an axial direction of the circular shape; and
assembling the outer component portion and the inner component portion such that the inner magnet is disposed inside the outer magnet through a gap and such that a magnetizing direction of the outer magnet and a magnetizing direction of the inner magnet are opposite to each other.

(14) The method of manufacturing a speaker according to (13), in which
the inner magnet has a ring shape with the diameter smaller than a diameter of the outer magnet, and
the forming the inner component portion includes forming a through-hole extending along an axial direction at a position of a central axis of the inner magnet.

(15) The method of manufacturing a speaker according to (13) or (14), in which
the assembling the outer component portion and the inner component portion includes inserting the inner magnet into an opening formed on a side opposite to a side of the outer component portion to which a vibrating plate component portion including a coil and a vibrating plate is connected.

(16) The method of manufacturing a speaker according to any one of (13) to (15), in which
the assembling the outer component portion and the inner component portion includes supporting at least one of the outer component portion or the inner component portion by a jig for equalizing the axial direction of the outer magnet and the axial direction of the inner magnet.

(17) The method of manufacturing a speaker according to any one of (13) to (16), further including:

forming a vibrating plate component portion including a coil and a vibrating plate; and assembling the outer component portion, the inner component portion, and the vibrating plate component portion such that the coil is disposed in a magnetic gap between the outer component portion and the inner component portion.

(18) The method of manufacturing a speaker according to any one of (13) to (17), further including forming a vibrating plate component portion including a coil and a vibrating plate, in which the forming the outer component portion includes assembling the unmagnetized outer component portion and the vibrating plate component portion, and magnetizing the unmagnetized outer magnet after the assembling the unmagnetized outer component portion and the vibrating plate component portion, and the assembling the outer component portion and the inner component portion includes assembling the inner component portion to the outer component portion in which the vibrating plate component portion is assembled, such that the coil is disposed in a magnetic gap between the outer component portion and the inner component portion.

(19) The method of manufacturing a speaker according to (18), in which the forming the outer component portion includes fixing a lead wire of the coil of the vibrating plate component portion by soldering between the assembling the unmagnetized outer component portion and the vibrating plate component portion and the magnetizing the unmagnetized outer magnet.

(20) The method of manufacturing a speaker according to (17), in which when a side on which the vibrating plate component portion is connected to the outer component portion is a first side, and a side opposite to the first side is a second side, the forming the outer component portion includes arranging an outer yoke on the second side of the outer magnet, the forming the inner component portion includes arranging an inner yoke on the second side of the inner magnet, and the assembling the outer component portion and the inner component portion includes connecting the outer yoke and the inner yoke to each other by welding.

REFERENCE SIGNS LIST

C reference axis
G1, G2 gap
MG magnetic gap
10, 210, 310 outer assembly
12, 212, 312, 412 outer magnet
17 opening
20 unmagnetized outer magnet (ferrimagnetic body)
25 unmagnetized outer assembly
30, 230, 330 inner assembly
31, 231, 331, 431 inner magnet
33, 333 inner yoke
35 through-hole
50, 250 vibrating plate assembly
51, 251 vibrating plate
52, 252 voice coil
53, 253 diaphragm ring
60 jig
100, 200 speaker
329 outer yoke
400 speaker unit

The invention claimed is:

1. A speaker, comprising:

an outer magnet that has a ring shape and is magnetized along an axial direction of the ring shape;

an inner magnet that has a circular outer shape when viewed from the axial direction of the outer magnet, is magnetized in a direction opposite to a direction of the outer magnet along the axial direction, and is disposed inside the outer magnet through a gaps;

an outer component portion including the outer magnet;

an inner component portion including the inner magnet and forming a magnetic gap with the outer component portion; and a vibrating plate component portion including a coil disposed in the magnetic gap and a vibrating plate;

wherein the outer component portion has an opening that is opened perpendicularly to the axial direction of the outer magnet and has a diameter larger than an outer diameter of the inner magnet a lead wire of the coil is extracted to an outside through the opening the inner magnet has a ring shape having an axial direction equal to the axial direction of the outer magnet and the inner magnet is inserted into the opening and fixed.

2. The speaker according to claim 1, wherein when a side on which the vibrating plate component portion is connected to the outer component portion in the axial direction is a first side, and a side opposite to the first side is a second side, the opening is formed on the second side of the outer component portion.

3. The speaker according to claim 1, wherein a position of a central axis of the outer magnet, a position of a central axis of the inner magnet, and a position of a central axis of the coil are configured to be equal to each other, and the inner component portion includes a through-hole extending along the axial direction at the position of the central axis of the inner magnet.

4. The speaker according to claim 1, wherein when a side on which the vibrating plate component portion is connected to the outer component portion in the axial direction is a first side, and a side opposite to the first side is a second side, the inner component portion includes an inner yoke magnetically connected to a second side of the inner magnet.

5. The speaker according to claim 4, wherein the inner yoke includes a first portion corresponding to the coil and a second portion corresponding to the inner magnet when viewed from the axial direction, and a thickness of the first portion is smaller than a thickness of the second portion.

6. The speaker according to claim 4, wherein the outer component portion includes an outer yoke magnetically connected to the second side of the outer magnet.

7. The speaker according to claim 6, wherein
the inner yoke and the outer yoke are connected to each other by welding.

8. The speaker according to claim 1, wherein the vibrating plate component portion includes a support magnet that supports the vibrating plate and is magnetized in a direction opposite to the direction of the outer magnet along the axial direction.

9. A method of manufacturing a speaker, comprising:
forming an outer component portion including an outer magnet that has a ring shape and is magnetized along an axial direction of the ring shape;
forming an inner component portion including an inner magnet that has a circular outer shape with a diameter smaller than an inner diameter of the outer magnet and is magnetized along an axial direction of the circular shape; and
assembling the outer component portion and the inner component portion such that the inner magnet is disposed inside the outer magnet through a gap and such that a magnetizing direction of the outer magnet and a magnetizing direction of the inner magnet are opposite to each other
wherein the assembling the outer component portion and the inner component portion includes supporting at least one of the outer component portion or the inner component portion by a jig for equalizing the axial direction of the outer magnet and the axial direction of the inner magnet.

10. The method of manufacturing a speaker according to claim 9, wherein
the inner magnet has a ring shape with the diameter smaller than a diameter of the outer magnet, and
the forming the inner component portion includes forming a through-hole extending along an axial direction at a position of a central axis of the inner magnet.

11. The method of manufacturing a speaker according to claim 9, wherein
the assembling the outer component portion and the inner component portion includes inserting the inner magnet into an opening formed on a side opposite to a side of the outer component portion to which a vibrating plate component portion including a coil and a vibrating plate is connected.

12. The method of manufacturing a speaker according to claim 9, further comprising:
forming a vibrating plate component portion including a coil and a vibrating plate; and
assembling the outer component portion, the inner component portion, and the vibrating plate component portion such that the coil is disposed in a magnetic gap between the outer component portion and the inner component portion.

13. The method of manufacturing a speaker according to claim 12, wherein
when a side on which the vibrating plate component portion is connected to the outer component portion is a first side, and a side opposite to the first side is a second side,
the forming the outer component portion includes arranging an outer yoke on the second side of the outer magnet,
the forming the inner component portion includes arranging an inner yoke on a second side of the inner magnet, and
the assembling the outer component portion and the inner component portion includes connecting the outer yoke and the inner yoke to each other by welding.

14. The method of manufacturing a speaker according to claim 9, further comprising
forming a vibrating plate component portion including a coil and a vibrating plate, wherein
the forming the outer component portion includes
assembling the outer component portion that is unmagnetized and the vibrating plate component portion, and
magnetizing the outer magnet that is unmagnetized after the assembling the outer component portion that is unmagnetized and the vibrating plate component portion, and
the assembling the outer component portion and the inner component portion includes
assembling the inner component portion to the outer component portion in which the vibrating plate component portion is assembled, such that the coil is disposed in a magnetic gap between the outer component portion and the inner component portion.

15. The method of manufacturing a speaker according to claim 14, wherein
the forming the outer component portion includes
fixing a lead wire of the coil of the vibrating plate component portion by soldering between the assembling the unmagnetized outer component portion and the vibrating plate component portion and the magnetizing the unmagnetized outer magnet.

* * * * *